(12) United States Patent
Dong et al.

(10) Patent No.: US 8,509,060 B1
(45) Date of Patent: Aug. 13, 2013

(54) ACTIVE-AVOIDANCE-BASED ROUTING IN A WIRELESS AD HOC NETWORK

(75) Inventors: Qing Dong, Birdsboro, PA (US); Albert Ortiz, Chalfont, PA (US); Donald D. Dalessandro, Williamstown, NJ (US); David J. Kocsik, Selbyville, DE (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 198 days.

(21) Appl. No.: 13/172,137

(22) Filed: Jun. 29, 2011

Related U.S. Application Data

(60) Provisional application No. 61/386,077, filed on Sep. 24, 2010.

(51) Int. Cl.
| | |
|---|---|
| *H04J 1/16* | (2006.01) |
| *H04L 12/28* | (2006.01) |
| *G06F 15/173* | (2006.01) |
| *H04L 12/56* | (2006.01) |

(52) U.S. Cl.
CPC .............. *H04L 45/28* (2013.01); *H04L 45/02* (2013.01)
USPC ............................ 370/221; 370/255; 709/243

(58) Field of Classification Search
USPC ............ 370/216, 217, 221, 225, 228, 255, 370/310; 709/243
See application file for complete search history.

(56) References Cited

U.S. PATENT DOCUMENTS

| | | | |
|---|---|---|---|
| 6,115,580 | A | 9/2000 | Chuprun et al. |
| 6,483,808 | B1 | 11/2002 | Rochberger et al. |
| 6,980,524 | B1 | 12/2005 | Lu et al. |
| 7,081,693 | B2 | 7/2006 | Hamel et al. |
| 7,256,505 | B2 | 8/2007 | Arms et al. |
| 7,382,765 | B2 | 6/2008 | Kennedy et al. |
| 7,400,253 | B2 | 7/2008 | Cohen |
| 7,429,805 | B2 | 9/2008 | Hamel et al. |
| 7,436,810 | B2 | 10/2008 | Ma et al. |
| 7,453,864 | B2 | 11/2008 | Kennedy et al. |
| 7,463,890 | B2 | 12/2008 | Herz et al. |
| 7,555,468 | B2 | 6/2009 | El-Damhougy |
| 7,624,165 | B2 | 11/2009 | Tucker et al. |

(Continued)

OTHER PUBLICATIONS

Richard S. Wolff & Gaurav Dawraa, "A Terrain Based Routing Protocol for Sparse Ad-Hoc Intermittent Networking (TRAIN)," Wireless & Optical Communication MultiConference, Wireless Networks & Emerging Technologies (WNET 2006), Jul. 3-5, 2006.

(Continued)

*Primary Examiner* — Paul H Masur
(74) *Attorney, Agent, or Firm* — Howard Kaiser

(57) ABSTRACT

Conventional multi-hop routing of ad hoc wireless networks involves considerations such as costs, connection quality, distances, and numbers of hops. A conventional wireless routing algorithm may fail when a destructive event takes place and is rapidly expanding in area, as the route discoveries may perpetually lag behind the rate of expansion of the destructive area. As typically embodied, the present invention's wireless routing algorithm detects a destructive event early, assumes rapid expansion of the destruction area, establishes "subnets" of nodes, and predetermines one or more routes that circumvent the rapidly expanding destruction area by exiting from and returning to the subnet in which the destructive event originates. Typical inventive practice avails itself of the architectural character of the physical setting for the wireless network, for instance by establishing subnets corresponding to compartments formed by wall-like structures (e.g., shipboard bulkheads), which represent natural barriers to expansion of a destruction area.

10 Claims, 18 Drawing Sheets

(56) References Cited

U.S. PATENT DOCUMENTS

| | | | |
|---|---|---|---|
| 7,719,416 B2 | 5/2010 | Arms et al. | |
| 7,760,585 B1 | 7/2010 | Ortiz et al. | |
| 7,764,958 B2 | 7/2010 | Townsend et al. | |
| 2003/0021223 A1* | 1/2003 | Kashyap | 370/217 |
| 2003/0067941 A1* | 4/2003 | Fall | 370/468 |
| 2006/0146696 A1* | 7/2006 | Li et al. | 370/218 |
| 2007/0038767 A1* | 2/2007 | Miles et al. | 709/230 |
| 2007/0274248 A1* | 11/2007 | Fukui et al. | 370/315 |
| 2008/0131123 A1* | 6/2008 | Park et al. | 398/66 |

OTHER PUBLICATIONS

F.L. Lewis, "Wireless Sensor Networks," Smart Environments: Technologies, Protocols, & Applications, ed. D.J. Cook & S.K. Das, John Wiley, New York, 2004.

"Automated Maintenance Environment," United States Navy, Wireless for a Hostile World, 3e Technologies International, 3eT1, 9715 Key West Avenue, 5th floor, Rockville, MD 20850, 1 page, publication date unknown.

Gaurav Dawra, "Terrain Based Routing Protocol for Sparse Ad-Hoc Intermittent Network (TRAIN)," thesis submitted for the degree of Master of Science in Computer Science, Montana State University, Bozeman, Montana, Nov. 2005.

Geetha Jayakumar & G. Gopinath, "Ad Hoc Mobile Wireless Networks Routing Protocols—a Review," Journal of Computer Science 3 (8); 574-582, 2007.

Pore Ghee Lye & John C. Mceachena, "Comparison of Optimized Link State Routing with Traditional Routing Protocols in Marine Wireless Ad-hoc & Sensor Networks," Proceedings of the 40th Hawaii International Conference on System Sciences, 2007.

Elizabeth M. Royer, "A Review of Current Routing Protocols for Ad Hoc Mobile Wireless Networks," IEEE Personal Communications, Apr. 1999.

Kavita Taneja & R.B. Patel, "Mobile Ad Hoc Networks: Challenges & Future," Proceedings of National Conference on Challenges & Opportunities in Information Technology (COIT-2007) RIMT-IET, Manadi Gobindgarh, Mar. 23, 2007.

U.S. Appl. No. 13/172,185, filed Jun. 29, 2011, inventors Albert Ortiz, Donald D. Dalessandro, Qing Dong, and John K. Overby, invention entitled "Power-Managing Energy-Harvesting Sensor Node for Situational Awareness Wireless Networking".

U.S. Appl. No. 61/388,480, filed Sep. 30, 2010, inventors Albert Ortiz et al.

U.S. Appl. No. 61/386,077, filed Sep. 24, 2010, inventors Qing Dong et al.

* cited by examiner

FIG. 3    ROUTE R1 = N1-N2-N3-N4

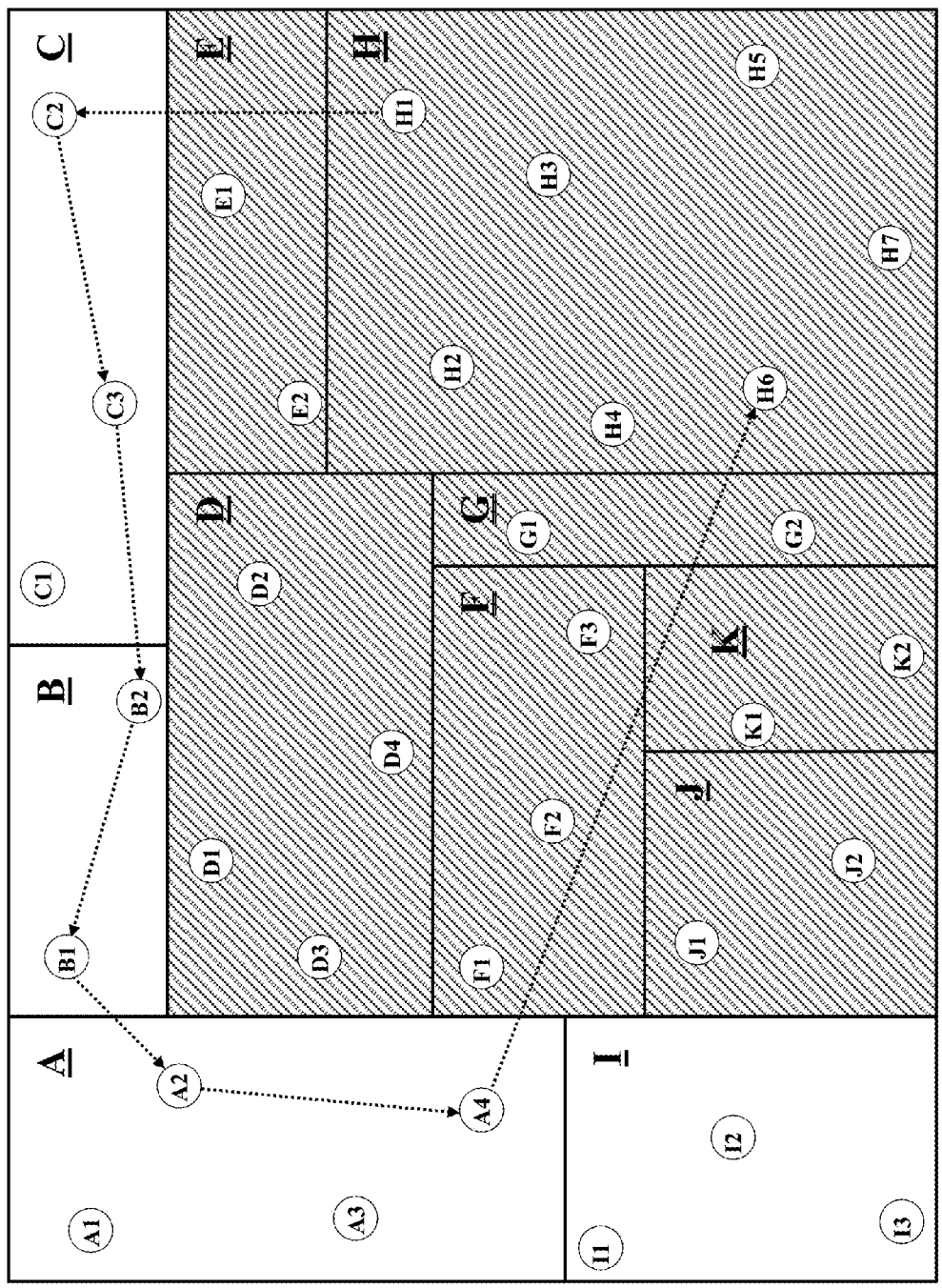

EXIGENT OPTIONS FOR SENSOR NODE H1

COMPARTMENTS

| | 1st | 2nd | 3rd | 4th | 5th | 6th | 7th | 8th | 9th | 10th |
|---|---|---|---|---|---|---|---|---|---|---|
| A | A1 A2 A3 A4 | A1 A2 A3 A4 | A1 A2 A3 A4 | A1 A2 A3 A4 | A1 A2 A3 A4 | A1 A2 A3 A4 | A1 A2 A3 A4 | A1 A2 A3 A4 | A1 A2 A3 A4 | A1 A2 A3 A4 |
| B | B1 B2 | B1 B2 | B1 B2 | B1 B2 | B1 B2 | B1 B2 | B1 B2 | B1 B2 | B1 B2 | B1 B2 |
| C | C1 C2 C3 | C1 C2 C3 | C1 C2 C3 | C1 C2 C3 | C1 C2 C3 | C1 C2 C3 | C1 C2 C3 | C1 C2 C3 | C1 C2 C3 | C1 C2 C3 |
| D | D1 D2 D3 D4 | D1 D2 D3 D4 | D1 D2 D3 D4 | D1 D2 D3 D4 | D1 D2 D3 D4 | D1 D2 D3 D4 | D1 D2 D3 D4 | D1 D2 D3 D4 | D1 D2 D3 D4 | D1 D2 D3 D4 |
| E | E1 E2 | E1 E2 | E1 E2 | E1 E2 | E1 E2 | E1 E2 | E1 E2 | E1 E2 | E1 E2 | E1 E2 |
| F | F1 F2 F3 | F1 F2 F3 | F1 F2 F3 | F1 F2 F3 | F1 F2 F3 | F1 F2 F3 | F1 F2 F3 | F1 F2 F3 | F1 F2 F3 | F1 F2 F3 |
| G | G1 G2 | G1 G2 | G1 G2 | G1 G2 | G1 G2 | G1 G2 | G1 G2 | G1 G2 | G1 G2 | G1 G2 |
| H | H1 H2 H3 H4 H5 H6 H7 | H1 H2 H3 H4 H5 H6 H7 | H1 H2 H3 H4 H5 H6 H7 | H1 H2 H3 H4 H5 H6 H7 | H1 H2 H3 H4 H5 H6 H7 | H1 H2 H3 H4 H5 H6 H7 | H1 H2 H3 H4 H5 H6 H7 | H1 H2 H3 H4 H5 H6 H7 | H1 H2 H3 H4 H5 H6 H7 | H1 H2 H3 H4 H5 H6 H7 |
| I | I1 I2 I3 | I1 I2 I3 | I1 I2 I3 | I1 I2 I3 | I1 I2 I3 | I1 I2 I3 | I1 I2 I3 | I1 I2 I3 | I1 I2 I3 | I1 I2 I3 |
| J | J1 J2 | J1 J2 | J1 J2 | J1 J2 | J1 J2 | J1 J2 | J1 J2 | J1 J2 | J1 J2 | J1 J2 |
| K | K1 K2 | K1 K2 | K1 K2 | K1 K2 | K1 K2 | K1 K2 | K1 K2 | K1 K2 | K1 K2 | K1 K2 |

FIG. 15

| LINK | COST FACTOR | TERRAIN EVALUATION FACTOR | PATH |
|---|---|---|---|
| I | $ least expensive path (e.g., shortest) | 🚩 🚩 🚩 🚩 🚩 most risky (least danger-elusive) path | IR4 - MC8 - TBR5 - MC11 - Valve |
| II | $ $ $ | 🚩 🚩 🚩 | IR4 - TBR6 - MC9 - MC12 - MC11 - Valve |
| III | $ $ $ $ $ most expensive path | 🚩 least risky (most danger-elusive) path | IR4 - TBR6 - .... TBR8 - TBR9 - TBR10 - TBR11 - Valve |
| IV | $ $ | 🚩 🚩 | IR4 - TBR6 - MC10 - TBR7 - TBR8 - TBR9 - TBR10 - TBR11 - Valve |

FIG. 18

ACTIVE-AVOIDANCE-BASED ROUTING IN A WIRELESS AD HOC NETWORK

CROSS-REFERENCE TO RELATED APPLICATIONS

This application claims the benefit of U.S. provisional application No. 61/386,077, filing date 24 Sep. 2010, hereby incorporated herein by reference, invention title "Active-Avoidance-Based Routing in a Wireless Ad Hoc Network," joint inventors Qing Dong, Albert Ortiz, Donald D. Dalessandro, and David J. Kocsik.

BACKGROUND OF THE INVENTION

The present invention relates to wireless communication, more particularly to routing of nodes in wireless ad hoc networks.

The so-called "ad hoc routing protocol" is a common genre of wireless routing protocols. A wireless ad hoc network is a kind of wireless network in which nodes are deployed in an "ad hoc" fashion. The nodes of a "multi-hop" wireless communication network are managed by an ad hoc routing protocol. Generally speaking, there are three categories of ad hoc wireless protocols for routing the nodes, viz., "table-driven" protocol, "on-demand" protocol, and "hybrid" protocol. Important aspects of wireless ad hoc networking include latency, chipset, and efficiency.

The "routing" of an attempted wireless communication from point "A" to point "B" is conventionally understood to involve the directing of an electromagnetic signal (e.g., radio waves) from node to node, starting at a source node (at or near point "A") and ending at a destination node (at or near point "B"). The signal may be routed directly from the source node to the destination node, or may be routed indirectly, i.e., with one or more signal-connecting nodes between the source node and the destination node. Conventional algorithms for "routing discovery" (discovering routes) are usually based on combinations of two criteria, viz., the shortest route and the highest link quality.

Though frequently effective, ad hoc routing protocols based on shortest route and highest link quality may prove unsatisfactory for some applications. In particular, a wireless communication network may be of such a critical nature that failures to communicate simply cannot be tolerated. For critical control functions, the provision of successful wireless communication without network latency is a vital capability. Wireless data communication for mission-essential tasks—for example, those onboard naval ships—should not be beset with difficulties akin to those prompting frustrated verbalizations by wireless voice communicators (e.g., cell phone users) such as "Can you hear me now?" or "Just wait . . . . Let me try to find a way to get back to you!"

The U.S. Navy is considering initiatives for reducing manning of future combat ships. Reduction of shipboard personnel will require greater automation of systems, not only for operation purposes but also for survivability purposes, particularly in terms of damage control. With regard to survivability, wireless communication can provide the capability of reconfiguring critical control system information for mission essential tasks, subsequent to damage of the primary wired system. A wireless sensor and control network (synonymously referred to herein as a "wireless sensor network") is a kind of network having a (usually, large) number of nodes. As envisioned by the U.S. Navy for damage control objectives, each node of a wireless sensor network will be equipped with various devices embedded therein, including a processor, one or more sensors, and a radio.

SUMMARY OF THE INVENTION

In view of the foregoing, an object of the present invention is to provide a self-configuring wireless communication routing protocol that is suitable for supporting wireless sensor networks designed for damage control, such as those considered for implementation onboard ships by the U.S. Navy.

The present invention, as typically embodied, provides a wireless communication routing method comprising (a) establishing at least one exigency route, (b) performing sensory monitoring, and (c) effecting an initial communicative transmission. The establishing of at least one exigency route includes dividing a wireless network of nodes so as to include plural subnets of nodes. The exigency route is to be executed for communication that is between a source node and a destination node that are resident in a home subnet that is beset with exigent circumstances. Each established exigency route is characterized by an initial communicative transmission from the source node to a node in a non-home subnet that is presumed to not be beset with exigent circumstances. Sensory monitoring of the home subnet is performed to determine whether the home subnet is beset with exigent circumstances. The effected initial communicative transmission is in accordance with an established exigency route and the performed sensory monitoring of the home said subnet.

According to many inventive embodiments, the present invention's wireless communication routing method further comprises performing sensory monitoring of each non-home subnet to determine whether the non-home subnet is beset with exigent circumstances. The effected initial communicative transmission is in accordance with the performed sensory monitoring of each non-home subnet. The established exigency route in accordance with which the initial communicative transmission is effected is determined, by the performed sensory monitoring of each non-home subnet, to be characterized by an initial communicative transmission to a node in a non-home said subset that is not beset with exigent circumstances.

According to some inventive embodiments, at least two exigency routes are established. The establishing of at least two exigency routes includes ordering the exigency routes in terms of preference. The initial communicative transmission is effected in accordance with the established exigency route of the highest preference that is determined by the sensory monitoring to be characterized by an initial communicative transmission to a node in a non-home subset that is not beset with exigent circumstances. According to typical inventive practice involving establishment of plural exigency routes, each established exigency route differs from every other established exigency route in terms of the subset to which the initial communicative transmission is made. The present invention is frequently practiced in association with a wireless network of nodes that is situated in a substantially compartmentalized setting. The subnets are divided in substantial comportment with at least some compartments of the substantially compartmentalized setting.

The present invention as typically practiced provides an adaptable algorithm for seeking alternative wireless communication routes in a large wireless sensor network. Typically featured by the present invention's routing algorithm are, inter alia, (i) division of a wireless network into relatively small, manageable compartments (e.g., "subnets"), and (ii) selection of a route in accordance with sensing of a damage event's physical (environmental) impact on the compartments. The inventive routing algorithm has indicia of both table-driven and on-demand genres of ad hoc protocols.

The present invention uniquely adapts to changing conditions attendant a damage event, e.g., one which is incendiary, ballistic, and/or explosive in nature. Important inventive principles are the premise that any given compartment may or may not be affected by a particular damage event, and the directive that a selected route must not include connection to a node contained in a compartment that is affected by the damage event, i.e., a compartment in which physical character indicative of the damage event is "sensed." Typical inventive practice implements sensory information that is indicative of occurrence of a damage event (i.e., existence of an exigent condition), such as sensory information in the nature of one or more of the following physical properties and phenomena: temperature; pressure; light (electromagnetism, e.g., intensity or imagery); sound; gas; ionization; smoke; fire; motion; chemistry. Implementation of the present invention's routing algorithm can guarantee a successful data communication path in a wireless sensor and sensor network under both normal and exigent circumstances.

The present inventors considered utilization of a communication technique involving mesh network broadcasting; however, mesh networking usually requires large memory and extensive computation power. Another approach considered by the present inventors involves purely table-driven routing protocol, which would exclude the network latency that normally accompanies a routing search; however, an entirely pre-determined routing table that is multicast as a redundant data communication route may be practically and economically disadvantageous, particularly insofar as its rigidity and its inability to adapt to changing circumstances.

Typical inventive practice senses one or more environmental (physical) characteristics and takes into consideration fixed terrain data (e.g., shipboard bulkheads), thereby succeeding in quickly discovering routes that are circumventive of damage areas and that benefit from insulative/isolative qualities of some terrain features. According to some inventive embodiments, neural network/fuzzy logic learning is performed of environmental data and/or terrain data in furtherance of the present invention's active-avoidance objectives. Based on the acquired knowledge, predictions are made of maximum-expansion damage areas, and routes are discovered that are circumventive of the predicted maximum-expansion damage areas. According to typical inventive embodiments, each inventive route exits the subnet in which the destructive event originates, connects to at least one node contained in at least one subnet outside the subnet in which the destructive event originates, and returns to the subnet in which the destructive event originates.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

As shown in FIG. 13, one compartment (the "home" compartment, viz., compartment "H") is unavailable for hopping. The home compartment is unavailable for all hops other than: (i) one hop from the source node (node "H1," located in compartment "H") to a node outside the home compartment; and, (ii) one hop from a node outside the home compartment to the destination node (node "H6," located in compartment "H"). Three "non-home" compartments (compartments "E," "D," and "G") are availed of by the inventively selected route.

FIG. 14 is the diagram of FIG. 10, amplified to illustrate an example, in accordance with the present invention, of "unavailability" of several compartments due to a damage event, and the consequent selection of an inventive wireless communication route. The source node (node "H1," located in compartment "H") and the destination node (node "H6," located in compartment "H") are the same in FIG. 13 and FIG. 14. As shown in FIG. 14, seven compartments (the "home" compartment, viz., compartment "H," and six "non-home" compartments, viz., compartments "D," "E," "F," "G," "J," and "K") are unavailable for hopping. The home compartment is unavailable for all hops other than: (i) one hop from the source node to a node outside the home compartment; and, (ii) one hop from a node outside the home compartment to the destination node. Three "non-home" compartments (compartments "C," "B," and "A") are availed of by the inventively selected route.

FIG. 15 is an example in tabular form of algorithmic logic, in accordance with the present invention, providing for a sequence of available exigent options pertaining to the diagram of FIG. 10 and starting from node H1. The available exigent options begin with the first option, and proceed to the second option if the first option is unavailable, and proceed to the third option if the second option is unavailable, and so on.

FIG. 18 is a table setting forth the four wireless communication routes shown in FIG. 16 and FIG. 17, and cost factors and terrain factors associated with each route. Route "I" is the best route among the four under normal circumstances. Route "III" is the best route among the four under exigent circumstances.

DESCRIPTION OF EXEMPLARY
EMBODIMENTS OF THE INVENTION

Figure 1:
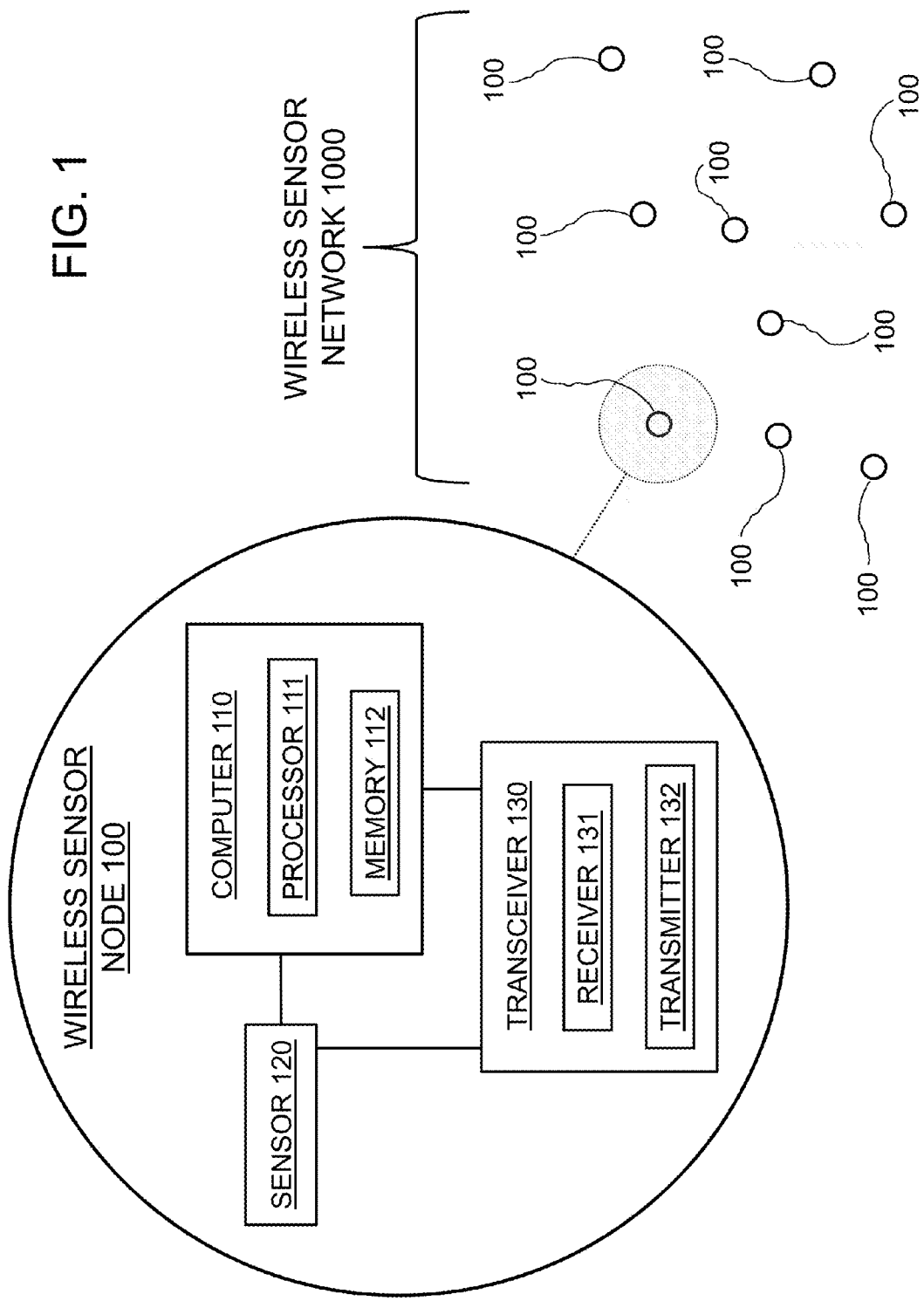
FIG. 1 is a diagram of a wireless sensor node representative of one included in a wireless sensor and control network (some nodes of which are shown by way of illustration) that lends itself to application of the present invention. Each node is equipped with (e.g., has embedded therein) a computer (including a processor, e.g., microprocessor, and a storage capability), one or more sensors, and a radio transceiver (including a transmitter and a receiver).
Figure 2:
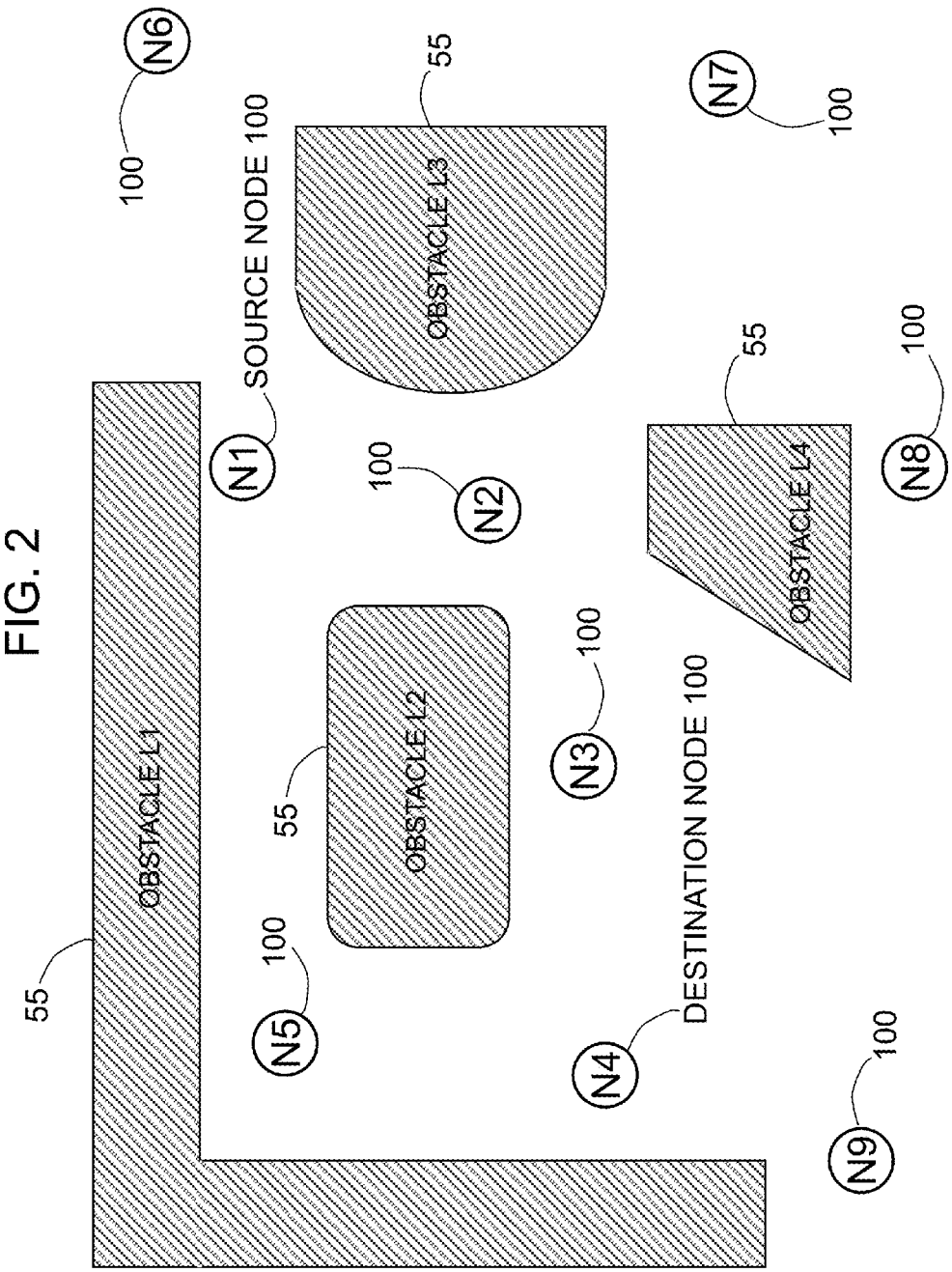
FIG. 2 is a diagram of an example of a group of nodes situated among several obstacles such as bulkheads and support structures.

Referring now to FIG. 1, wireless sensor network 1000 includes many wireless router-and-sensor nodes 1000. Each node 100 includes an embedded computer 110 (which includes a processor 111 and a memory 112), at least one sensor 120, and a radio transceiver 130 (which includes a receiver 131 and a transmitter 132). Nodes 100 of wireless sensor network 1000 collaborate to accomplish one or more joint tasks such as environment monitoring and/or situation awareness and/or actuator control. In each node 100, computer 110, sensor(s) 120, and transceiver 130 are interconnected, typically through wiring.

It is understood by the ordinarily skilled artisan who reads this disclosure that power is supplied to the electronic components of each node 100. Power can be provided, for instance, via shipboard wiring, or via dc power supply (e.g., one or more batteries) that is embedded in or otherwise associated with a node 100. Recent literature has disclosed management of power consumption in wireless systems, such as through energy (power) harvesting, and/or power reduction (e.g., "sleep mode") under prescribed circumstances. See, e.g., the following United States patents: Townsend et al. No. 7,764,958 B2, Arms et al. No. 7,719,416 B2, Hamel et al. No. 7,429,805 B2, Cohen No. 7,400,253 B2, Arms et al. No. 7,256,505 B2, Hamel et al. No. 7,081,693 B2. Energy can be harvested from ambient sources such as light (electromagnetism), sound, vibration, heat, etc. A solar cell, for instance, is a well known type of energy harvester.

Of note in this regard, present inventor Albert Ortiz et al. have invented a power management methodology that may be beneficial to practice in association with the present invention. See U.S. provisional application No. 61/388,480, filing date 30 Sep. 2010, hereby incorporated herein by reference, invention title "Power-Managing Energy-Harvesting Sensor Node for Situationally Aware Wireless Networking," joint inventors Albert Ortiz, Donald D. Dalessandro, Qing Dong, and John K. Overby. Ortiz et al.'s power management methodology integrates elements including the following into a single independent sensing unit: low power sensing; low power radio frequency (RF) wireless transceiving; energy harvesting and storage; and, a power consumption management strategy, such as involving scheduling and event-driven activity. Typically according to Ortiz et al. power management methodology, the computer processing is tri-chotomized in a progressive and power-regulating manner as: (i) a low-performance processor (for performing routing sensing functions); (ii) a middle-performance processor (for performing middle-computation function such as validative sensing functions, and which remains in sleep mode until activated upon demand for a middle-computation function); and, (iii) a high-performance processor (for performing high computation functions such as remedial communicative functions, and which remains in sleep mode until activated upon demand for a high-computation function). Some transceivers may be "over-the-air-interrupt" transceivers, which may be used for the specific purpose of wirelessly communicating "wake-up" signals between different nodes. An over-the-air-interrupt transceiver includes a transmitter and receiver, preferably requires minimal power, and can either wirelessly transmit or wirelessly receive signals that awaken a device or device component from sleep mode.

Of some interest herein is co-pending U.S. patent application Ser. No. 13/161,652, filing date 16 Jun. 2011, incorporated herein by reference, invention title "Wireless Electric Power Transmission Through Wall," joint inventors Albert Ortiz, Donald D. Dalessandro, John M. Roach, Donald R. Longo, and Qing Dong.

Computer 110 is capable of receiving sensor signals from sensor(s) 120 of the same node, and of processing the sensor signals. In addition, computer 110 is capable of receiving communication signals from transceiver 130 of the same node, and of processing these communication signals; these communication signals are those that are transmitted wirelessly by another node 100 and that are received wirelessly by transceiver 130 (via receiver 131) of the same node 100. Computer 110 is capable of sending its own communications to transceiver 130 for being wirelessly transmitted (via transmitter 132) to another node 100, for instance once computer 110 processes either the sensor signals or the communication signals or both. Every node 1000 has the same ad hoc wireless routing algorithm resident in the nonvolatile portion of its computer 110's memory 112.

With reference to FIG. 2 through FIG. 9, let us assume that nodes 100 are deployed in an ad hoc fashion, organizing themselves to form a multi-hop wireless communication network 1000 that is managed by a routing protocol. Wireless ad hoc sensor network 1000, which includes multiple fixed nodes 100 for sensing physical characteristics and for communicating with each other, is devised for controlling damage (e.g., from fire or explosion) onboard a ship. Obstacles L1, L2, L3, and L4 are diagrammatically representative of various types of structures 55 (such as bulkheads and supports) that may be present, and that may be taken into consideration according to inventive practice. Let us further assume that the "source" (beginning) node 100 is node N1, and that the "destination" (ending) node 100 is node N4. Otherwise expressed, source node N1 is seeking to send a signal to destination node N4.

Figure 3:
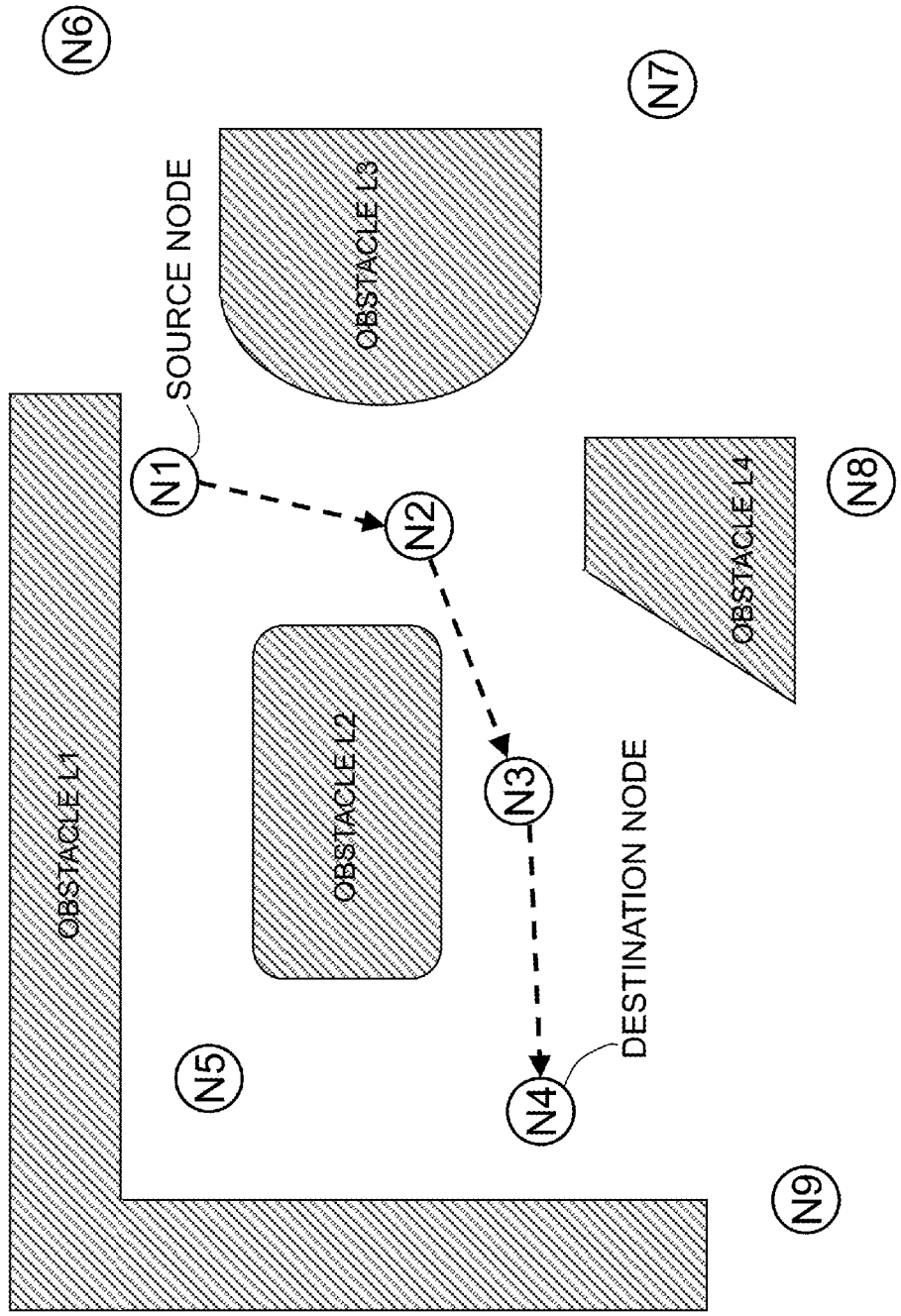
FIG. 3 is the diagram of FIG. 2, amplified to illustrate a conventional wireless communication route, which is a wireless communication route that may be selected, in the context shown in FIG. 2, in accordance with a conventional routing algorithm.
Figure 4:
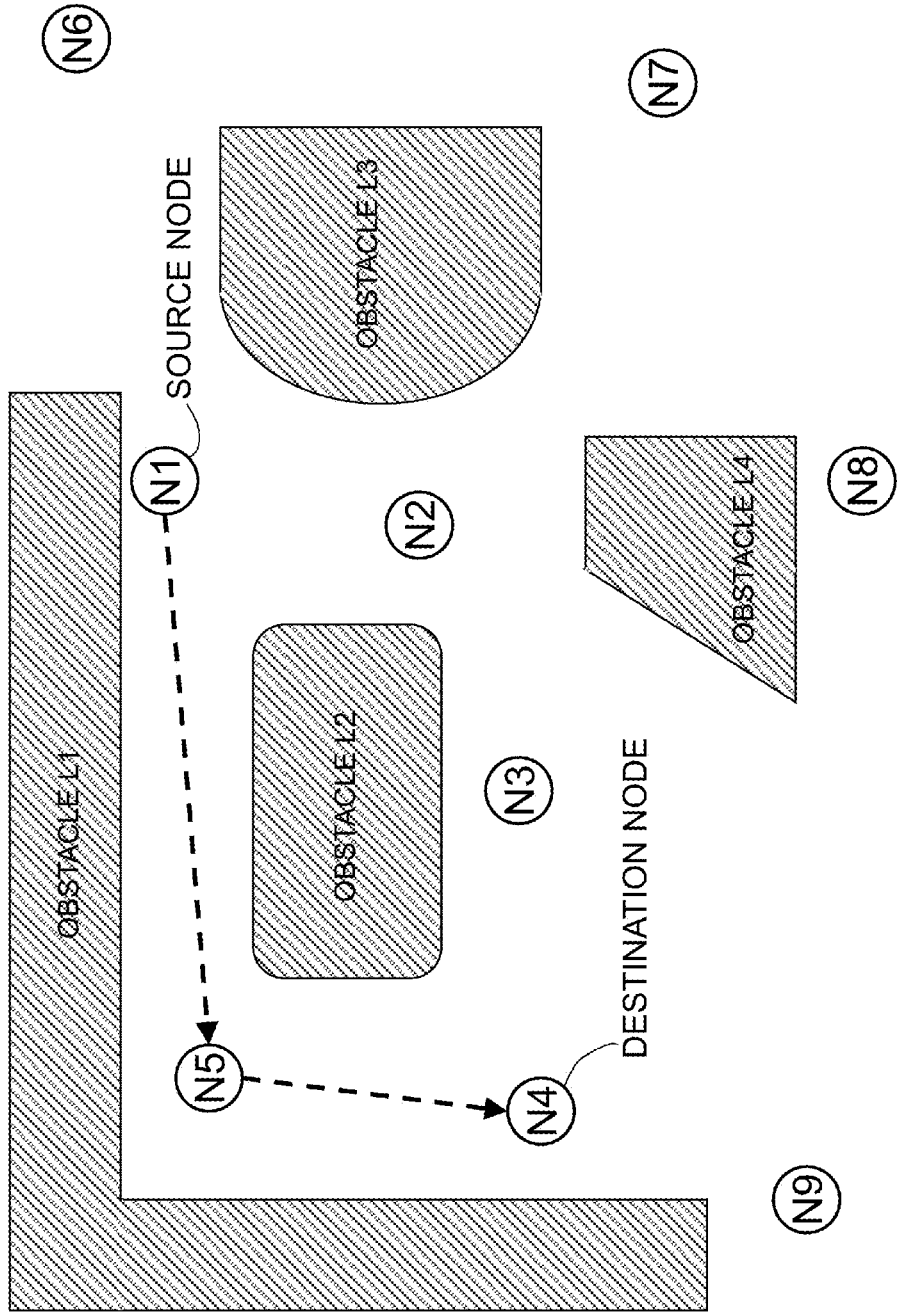
FIG. 4 is the diagram of FIG. 2, amplified to illustrate another conventional wireless communication route, different from the conventional wireless communication route shown in FIG. 3.

As illustrated in FIG. 3 and FIG. 4, under normal (non-exigent) circumstances damage control wireless network 1000 implements conventional ad hoc routing principles, e.g., based on considerations involving shortest routes and highest link quality and related factors such as number of hops and cost. A conventional ad hoc routing algorithm may discover route N1-N2-N3-N4 (shown in FIG. 3), or route N1-N5-N4 (shown in FIG. 4).

Route N1-N2-N3-N4 is characterized by three "hops," viz., from N1 to N2, from N2 to N3, and from N3 to N4. Route N1-N5-N4 is characterized by two hops, viz., from N1 to N5 and from N5 to N4. Route N1-N2-N3-N4 may be chosen if its link quality is sufficiently better than that of route N1-N5-N4 that this consideration outweighs the lower cost associated with the latter route's fewer hops. On the other hand, if the link quality is about the same for each route (e.g., high for each route, or moderate for each route), then the lower cost of route N1-N5-N4 may be determinative. Another possibility is that route N1-N5-N4 has better link quality because of its fewer hops, and mainly for this reason is selected over route N1-N2-N3-N4.

Note that obstructions and other structures 55, such as obstacles L1, L2, L3, and L4, may or may not interfere with radio transmission, depending on the structure 55. For instance, obstacle L1 may represent an L-shaped walling construction such as formed by two perpendicularly adjoining bulkheads 55 onboard a ship. Generally speaking, radio waves can pass through conventional shipboard bulkheads. Nevertheless, it is noted in this regard that there may be differences among the bulkheads of a particular ship; for instance, bulkheads below a ship's waterline may be thicker (e.g., constructed of a heavier gage steel) than bulkheads above the ship's waterline. In contrast, one or more of the other obstructions, such as obstacle L2, may be too thick or be otherwise constructed as to essentially block radio transmission. If obstacle L2 is characterized by low radio transmittance, this reduces the number of possible routing paths between source node N1 and destination node N4; in particular, the direct and shortest route, route N1-N4, is precluded as an option. This illustrates how one or more obstructions in a small or confined area can reduce, often dramatically, the effectiveness of an ad hoc wireless communication routing algorithm. As a generalization it can be said that the thicker the structure, the greater the attenuation of radio frequency (RF) signals.

Of interest is Albert Ortiz et al. U.S. Pat. No. 7,760,585 B1 issued 20 Jul. 2010, incorporated herein by reference, entitled "Through the Bulkhead Repeater." Ortiz et al. '585 disclose method and apparatus for wirelessly transmitting radio frequency (RF) signals (and associated information) through thick-walled structures such as ship bulkheads. Present inventor Albert Ortiz is also an inventor of a wireless electric power transmission methodology that is similar in principle to the wireless electric signal transmission methodology of Ortiz et al. '585.

Figure 5:
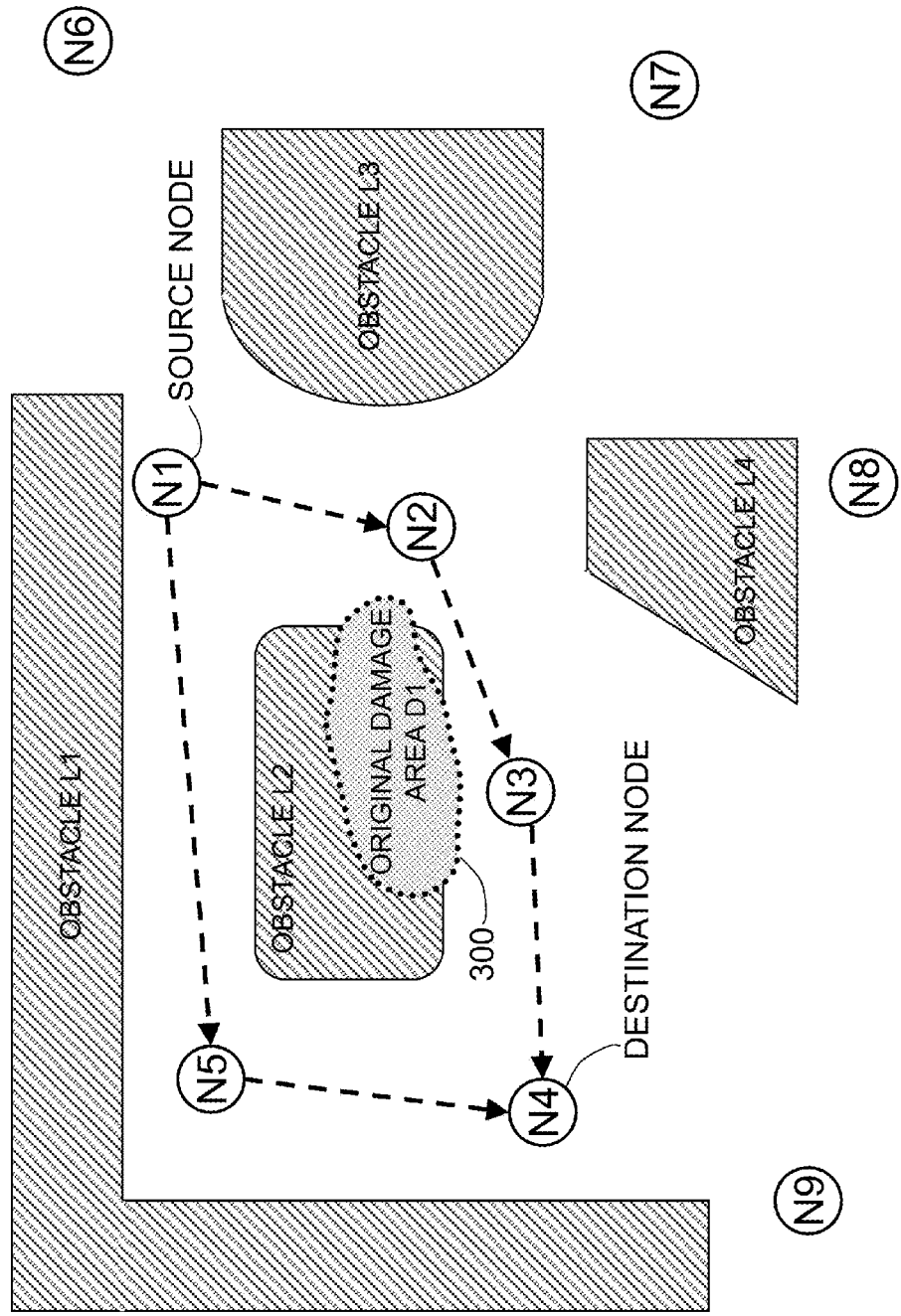
FIG. 5 is the diagram of FIG. 2, amplified to illustrate both of the conventional wireless communication routes shown in FIG. 3 and FIG. 4, and to illustrate the beginnings of a damage event.

Moving on to FIG. 5 through FIG. 9, let us further assume that a damage event 300 has begun and continues to take place. Fire in the vicinity has been sensed by node N1, and that it is imperative that node N1 send a message to node N4 to cause N4 to actuate a nearby water sprinkler valve to control or extinguish the fire. As shown in FIG. 5, the damage has just begun. At this point in time, damage area D1 is still small enough that either route N1-N5-N4 or route N1-N2-N3-N4 can successfully link node N1 to node N4. That is, both conventional routes are circumventive of damage area D1, and therefore remain viable.

Figure 6:
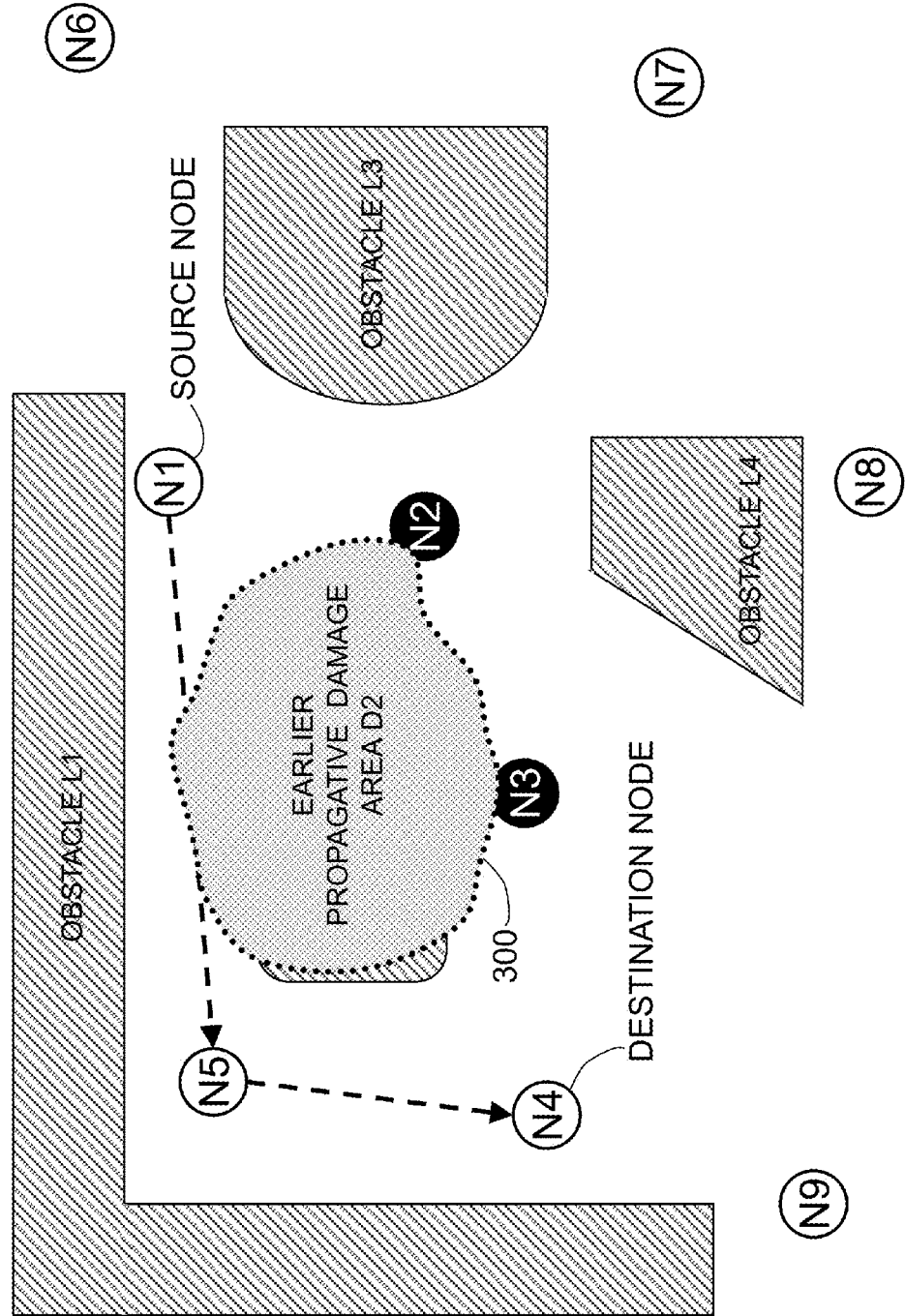
FIG. 6 is the diagram of FIG. 5, modified to illustrate expansion of the damage event shown in FIG. 5, and to illustrate the incapacitation by the expanding damage event of two of the nodes, with the result that one of the two conventional wireless communication routes remains viable.
Figure 7:
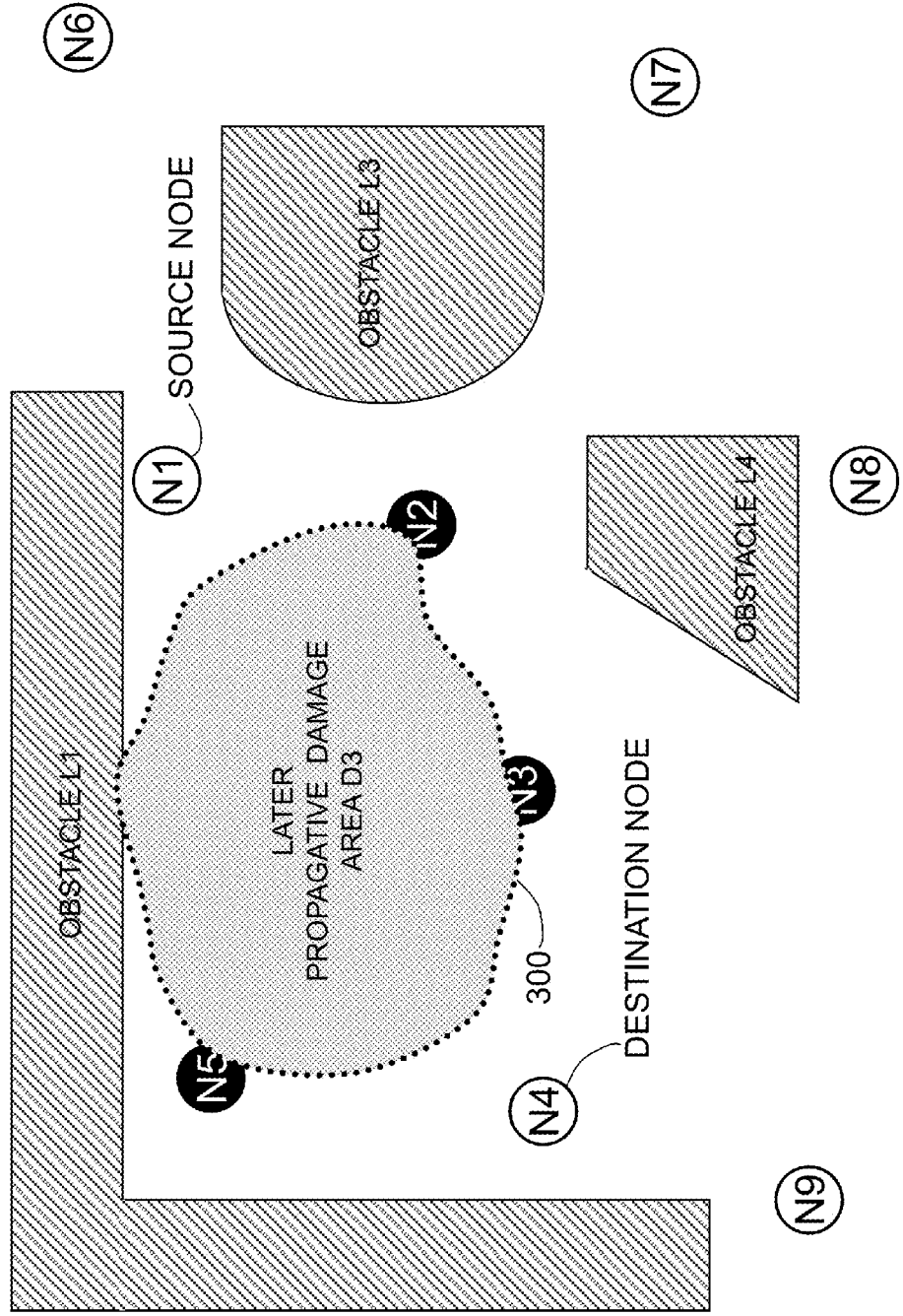
FIG. 7 is the diagram of FIG. 6, modified to illustrate further expansion of the damage event (beyond that shown in FIG. 6), and to illustrate the incapacitation by the further expanding damage event of three of the nodes (as distinguished from incapacitation of two of the nodes as shown in FIG. 6), with the result that neither conventional wireless communication route remains viable.

As shown in FIG. 6, route N1-N2-N3-N4 is no longer viable because nodes N2 and N3 are almost immediately incapacitated due to rapid expansion of damage area D1 to damage area D2. As shown in FIG. 7, route N1-N5-N4 has also lost viability because node N5 has become incapacitated due to rapid expansion of damage area D2 to damage area D3. Three nodes 100 (nodes N2, N3, and N5) are shown to be incapacitated in FIG. 7. Accordingly, due to the rapid expansion of the original damage area D1 (FIG. 5) to larger damage area D2 (FIG. 6) to even larger damage area D3 (FIG. 7 and FIG. 8), neither of the alternative link configurations that are discoverable through conventional ad hoc routing principles will succeed once the damage event has quickly grown to damage area D3. It may be a matter of moments or even milliseconds between damage area D1 and its expansion to damage area D3.

FIG. 5 through FIG. 7 and FIG. 9 illustrate how a damage-control wireless network 1000 that implements traditional ad hoc routing principles may be unable to reconfigure a communication link that has been terminated due to damage, especially if the damage is rapidly increasing in area. If a communication link is broken, it will take some time to reconfigure to a new communication link. However, the damage area may rapidly expand in such a manner as to "outrace" connection of every prospective link configuration that conventional ad hoc routing principles are capable of discovering. In other words, it is likely that all of the alternative link configurations that are discoverable through conventional ad hoc routing principles will be forestalled by damage to, or destruction of, at least one node necessary to communication. Application of conventional network routing principles thus perpetuates a routing search stuck in an infinite routing search loop, resulting in never-ending failure to establish any meaningful communication link.

Figure 9:
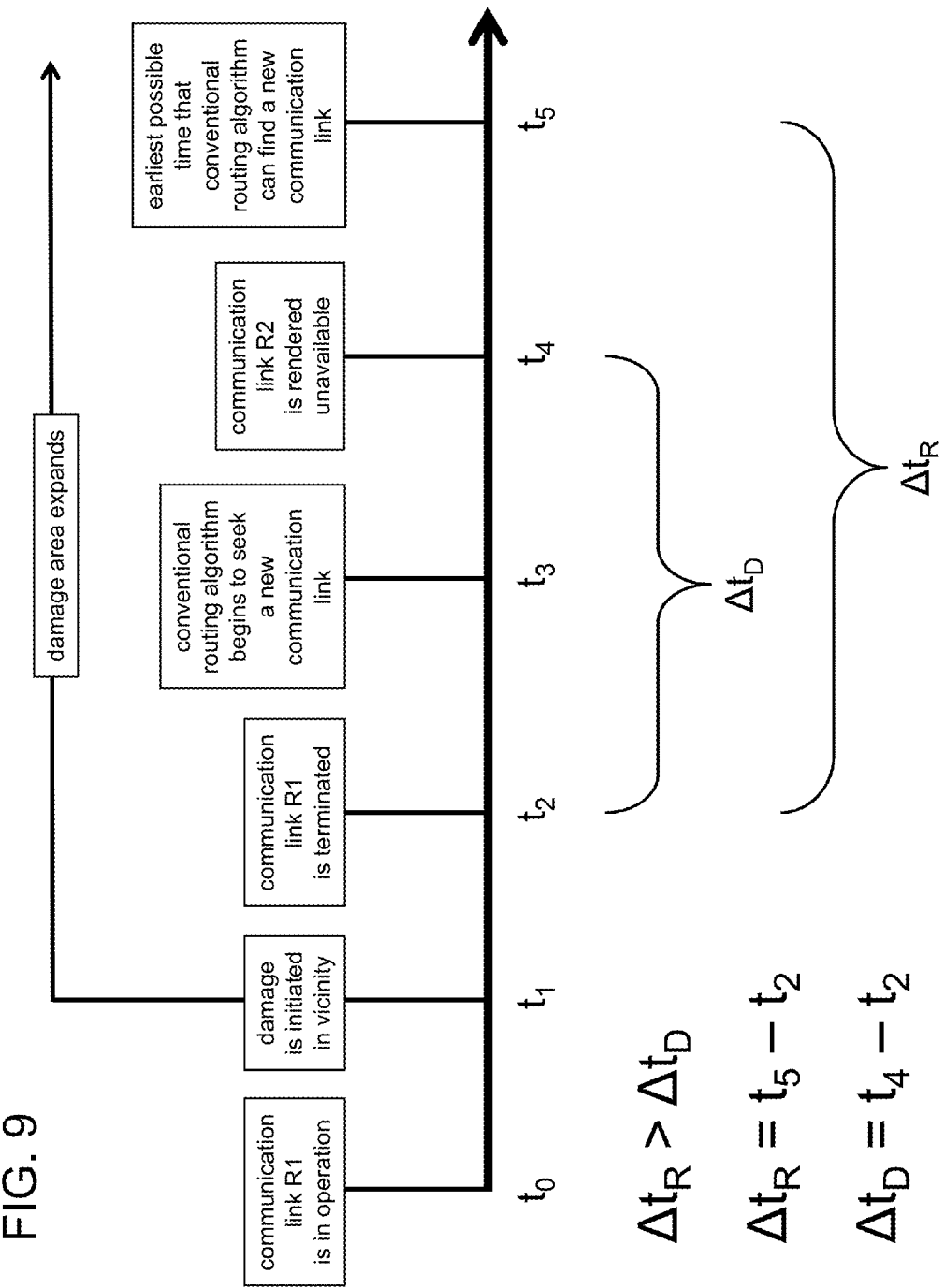
FIG. 9 is a timeline illustrating how a conventional wireless routing protocol may fail to connect a source node to a destination node under circumstances of a damage event, because the damage event expands more rapidly than the conventional wireless routing protocol is capable of discovering alternative wireless communication routes.
Figure 10:
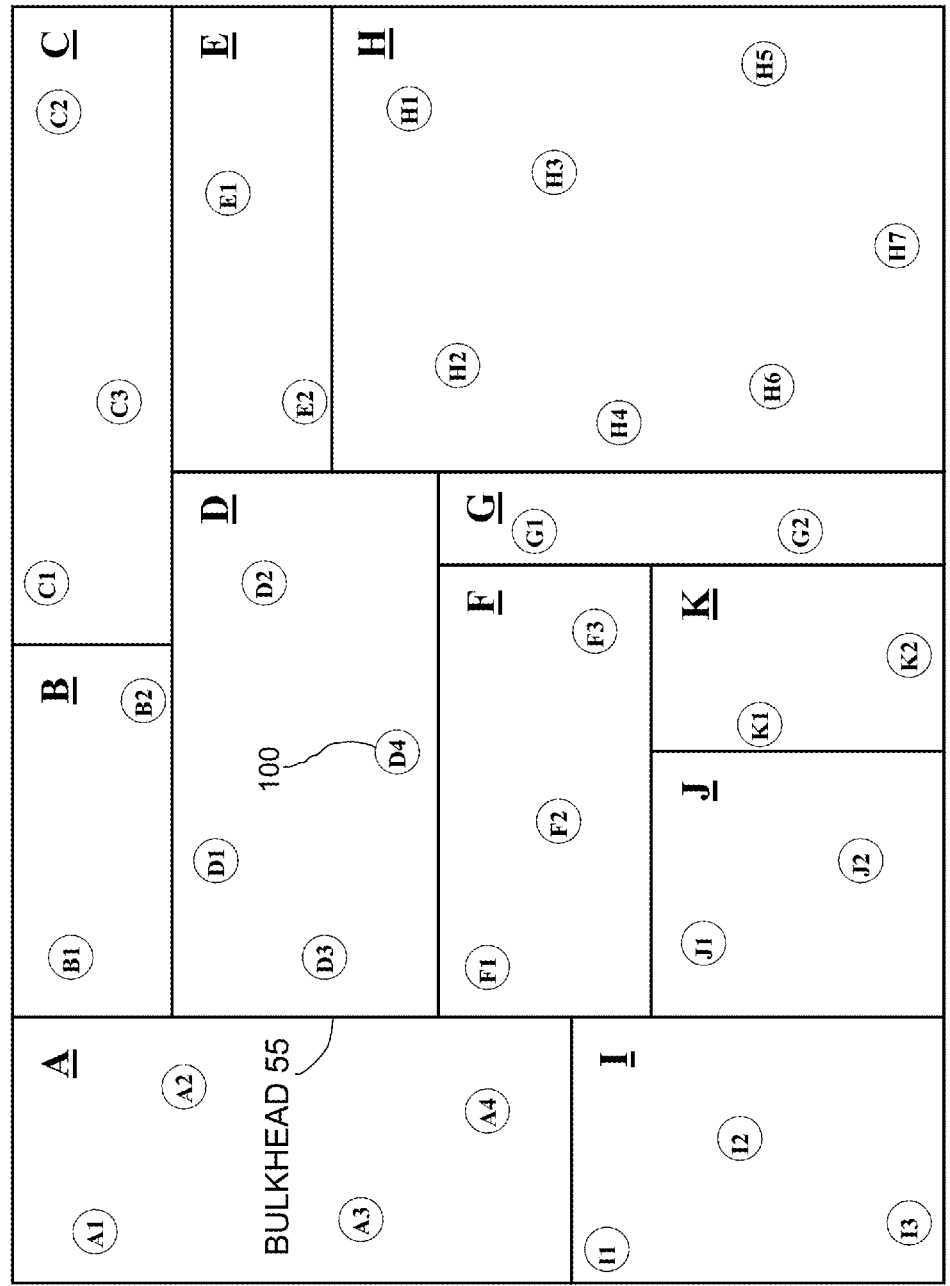
FIG. 10 is a diagram of another example of nodes in a wireless network. The nodes shown in FIG. 10 are much more numerous than the nodes shown in FIG. 2 and are situated, at least two nodes per compartment, in eleven compartments. The compartments are shown in FIG. 10 to be rectangular for illustrative purposes only, as inventive principles are applicable to compartments of diverse shapes, such as the variously shaped compartments that may be demarcated by bulkheads of a naval ship.
Figure 11:
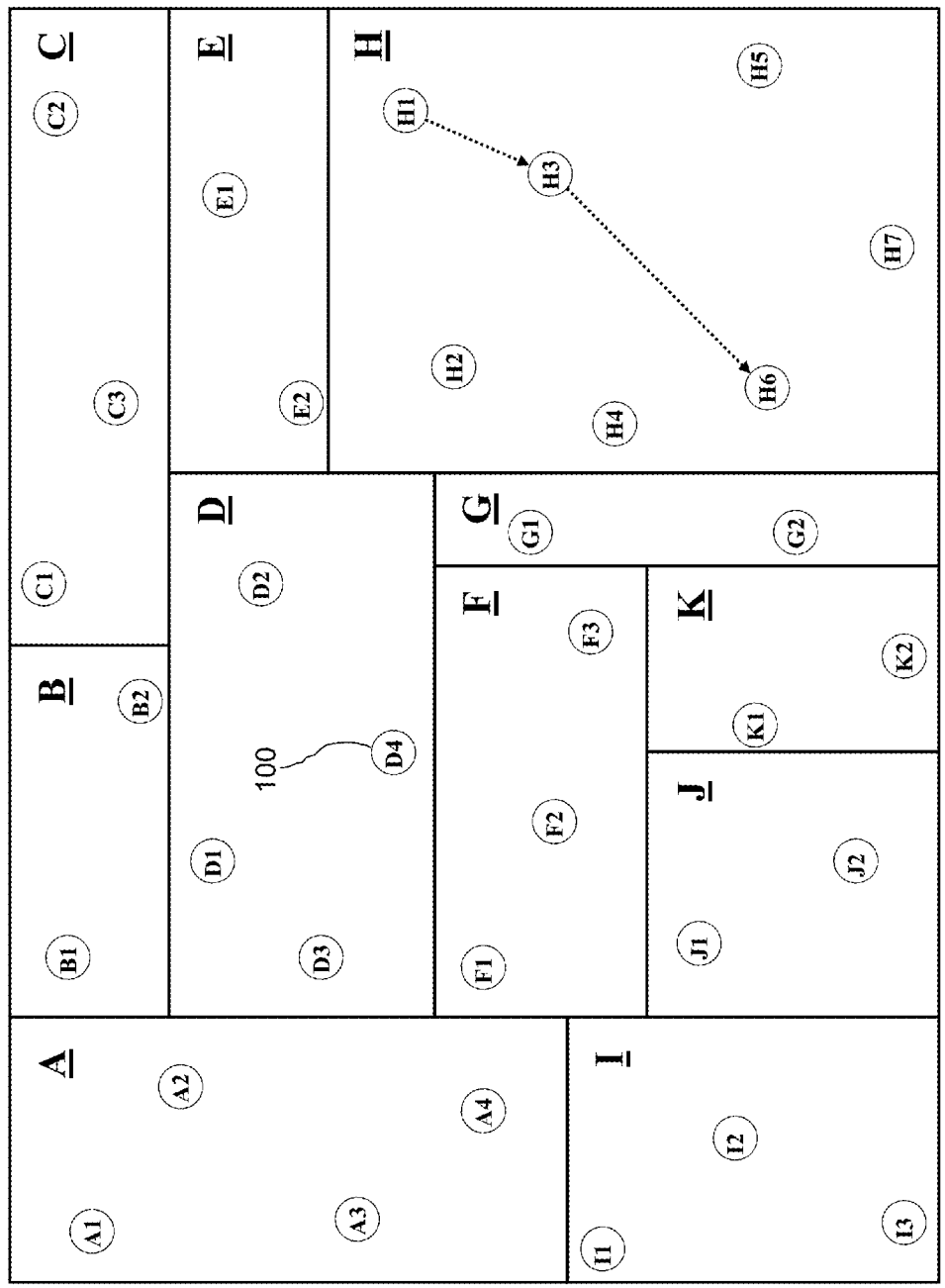
FIG. 11 is the diagram of FIG. 10, amplified to illustrate a conventional wireless communication route, which is a wireless communication route that may be selected, in the context shown in FIG. 10, in accordance with a conventional routing algorithm.
Figure 12:
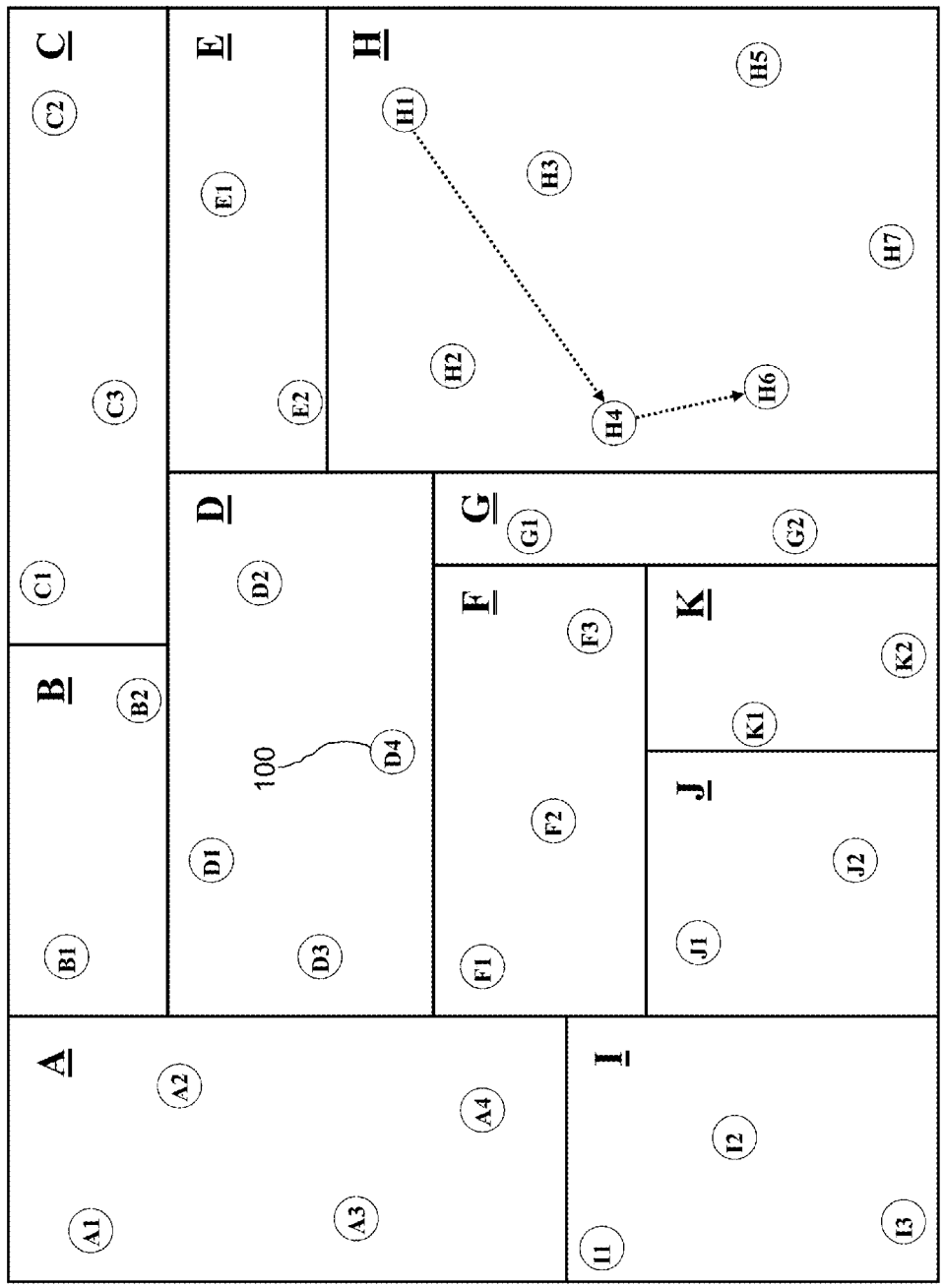
FIG. 12 is the diagram of FIG. 10, amplified to illustrate another conventional wireless communication route, different from the conventional wireless communication route shown in FIG. 11.

As FIG. 9 demonstrates by way of example via timeline, if a communication link "R1" is broken, it will take some time to reconfigure to a new communication link "R2." During a shipboard damage event, for instance, one or more portions of the damage control system network 1000 may be disabled, thus requiring the establishment of a new damage control communication link on the network 1000. A number of wireless router nodes 100 in and around the damaged region may be in jeopardy of failure as the damaged area expands dramatically, starting immediately upon the inception of the damage event at time $t_1$. A traditional ad hoc routing algorithm will begin to attempt to discover a new communication link at time $t_3$, which is shortly after the time that the current communication link has been terminated by damage, namely, time $t_2$.

Traditional ad hoc routing principles (based on shortest route and highest link quality) will fail because the damage area will expand faster, as represented by time $t_4$, than new routes can be either found or both found and effectuated, as represented by time $t_5$. The time $\Delta t_R$ that it takes to reconfigure communication (where $\Delta t_R = t_5 - t_2$) is forever greater than the time $\Delta t_D$ that it takes for the damage to spread to sufficient extent to preempt the communication reconfiguration (where $\Delta t_D = t_4 - t_2$). The rapidly expanding damage area will conquer newly reconfigured communication routes as they are being discovered (or as newly discovered routes are being developed) by traditional ad hoc routing principles.

Figure 8:
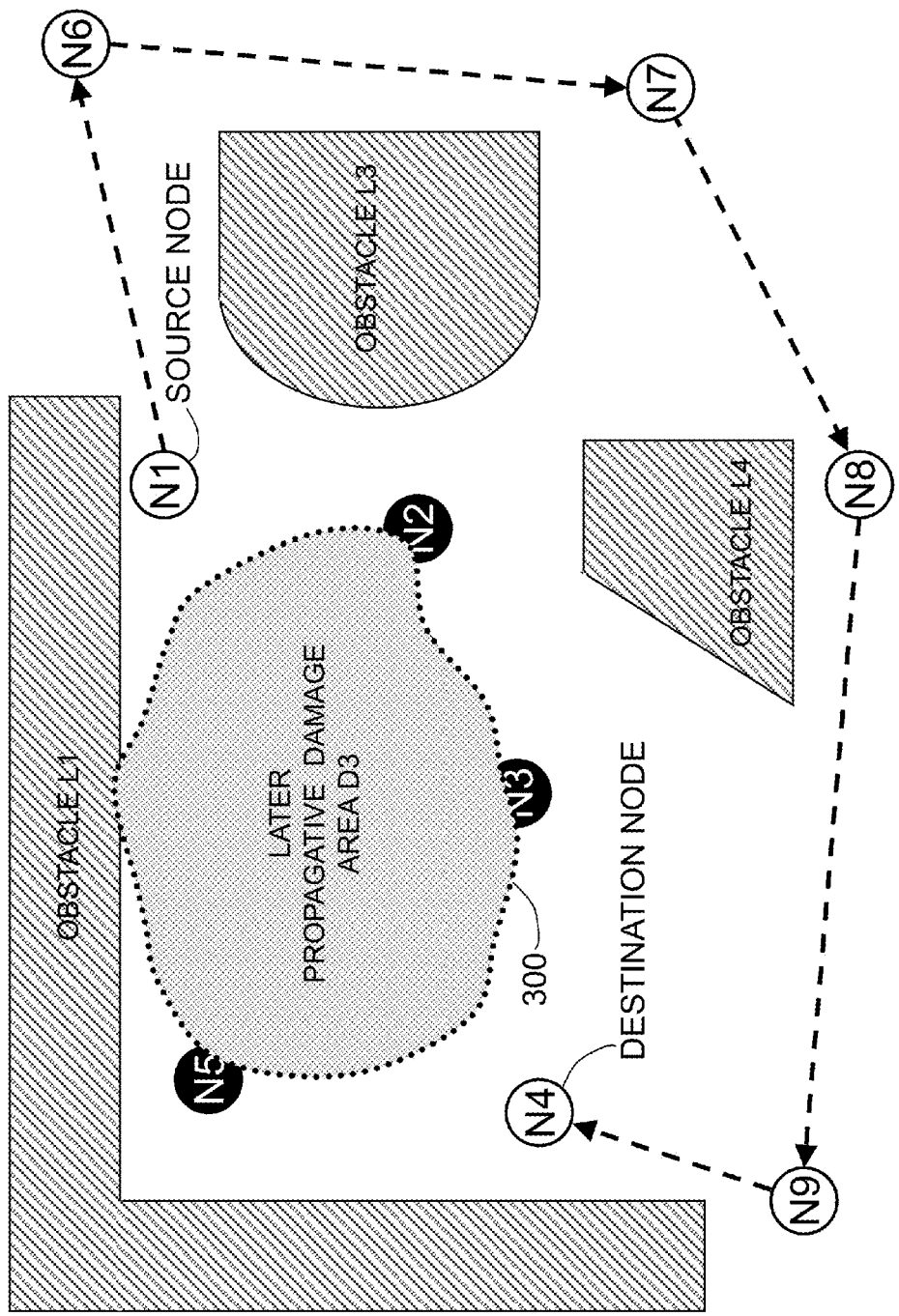
FIG. 8 is the diagram of FIG. 7, amplified to illustrate an example of selection of a wireless communication route in accordance with the present invention.

FIG. 8 illustrates how a damage-control wireless network 1000 that implements inventive ad hoc routing principles is able to reconfigure a communication link that has been terminated due to a damage event that is rapidly increasing in area. Immediately upon the sensing of an environmental condition indicative of an exigency, the inventive ad hoc routing algorithm selects route N1-N6-N7-N8-N9-N4 to link from source node N1 to destination node N4. This is neither the shortest route, nor the most economical route, nor the route with the least number of hops, nor the route affording the highest quality linkage; however, this is the safest route in the face of an exigency.

Still referring to FIG. 8 and again referring to FIG. 1, the inventive routing algorithm selects route N1-N6-N7-N8-N9-N4 in basically the following manner. Source node N1's sensor 120 senses an environmental condition, such as increased ambient temperature, that is indicative that a damage event is occurring. In node N1, sensor 120 notifies computer 110 of this sensed condition. Node N1's computer 110 wishes to send a message to node N4 to open a valve proximate node 4 in order to activate a fire sprinkler system. Implementing a software embodiment of an inventive routing algorithm, node N1's computer 110 decides upon route N1-N6-N7-N8-N9-N4 as the best route under the exigent circumstances. Node N1's computer 110 signals node N1's transceiver 130 in accordance with the selected route and the valve actuation command. In turn, node N1's transceiver 130 transmits a signal informative of the selected route and the valve actuation command to node N6, which then transmits such a signal to node N7, which then transmits such a signal to node N8, which then transmits such a signal to N9, when then transmits such a signal to destination node N4.

The present invention takes unique advantage of the inherent environmental "architecture" of some wireless networks. Availed of by the present invention is the innate protectiveness of the terrain on which the wireless network is situated and intended to operate. Onboard a modern naval ship, for instance, a wireless sensor network is likely to be physically separated into many sections by watertight steel bulkheads. These sections represent an important aspect of inventive practice, and are referred to herein as "subnets" in the context of inventive practice. The ship's bulkheads divide the interior space into compartments. Typical shipboard applications of the present invention establish inventive subnets along compartmental lines. According to some inventive embodiments onboard a ship, the number of wireless nodes in each subnet (i.e., in each compartment) will range between fifteen and thirty. The bulkheads are obstructive in one sense, but not in another. That is, the bulkheads are wall-like physical barriers that act to stem, impede, or prevent expansion of a damage area. On the other hand, the bulkheads do not significantly interfere with a wireless network's radio transmissions, which can pass through the bulkheads.

Reference is now made to FIG. 10 through FIG. 15, which highly diagrammatically portray, in plan view, a wireless sensor network 1000 onboard a deck of a ship. The wireless sensor network 1000 includes thirty-four nodes 100. The present invention takes advantage of the fact that the ship is constructed so as to include many vertical bulkheads 55, and that some of these bulkheads 55 form eleven compartments 50 on the ship deck shown, each compartment 50 encompassing plural nodes 100. The present invention divides wireless network 1000 into eleven subnets 500. Each subnet 500 corresponds to a single compartment 50, and essentially consists of all of the nodes 100 that are encompassed by that compartment 50.

The eleven compartments 50 and the nodes 100 that they respectfully contain are listed in FIG. 15. Each inventive subnet 500 is defined by the compartment that contains it. Accordingly, the compartment "A" subnet is constituted by nodes "A1," "A2," "A3," and "A4"; the compartment "B" subnet is constituted by nodes "B1 and "B2"; the compartment "C" subnet is constituted by nodes "C1," "C2," and "C3"; the compartment "D" subnet is constituted by nodes "D1," "D2," "D3," and "D4"; the compartment "E" subnet is constituted by nodes "E1" and "E2"; the compartment "F" subnet is constituted by nodes "F1," "F2," and "F3"; the compartment "G" subnet is constituted by nodes "G1" and "G2"; the compartment "H" subnet is constituted by nodes "H1," "H2," "H3," "H4," "H5," "H6," and "H7"; the compartment "I" subnet is constituted by nodes "I1," I2," and I3"; the compartment "J" subnet is constituted by nodes "J1" and "J2"; the compartment "K" subnet is constituted by nodes "K1" and "K2."

Under normal (non-exigent) circumstances, inventive practice may yield to conventional algorithmic principles based on a balancing of cost versus quality; factors such as travel distance and/or number of hops may figure in a conventional analysis weighing lowest cost linkage versus highest quality linkage. Hence, if node "H1" is to communicate with node "H6," both of which are in the compartment "H" subnet, either route H1-H3-H6 (shown in FIG. 11), or route H1-H4-H6 (shown in FIG. 12), may be a reasonable choice pursuant to conventional algorithmic routing.

Figure 13:
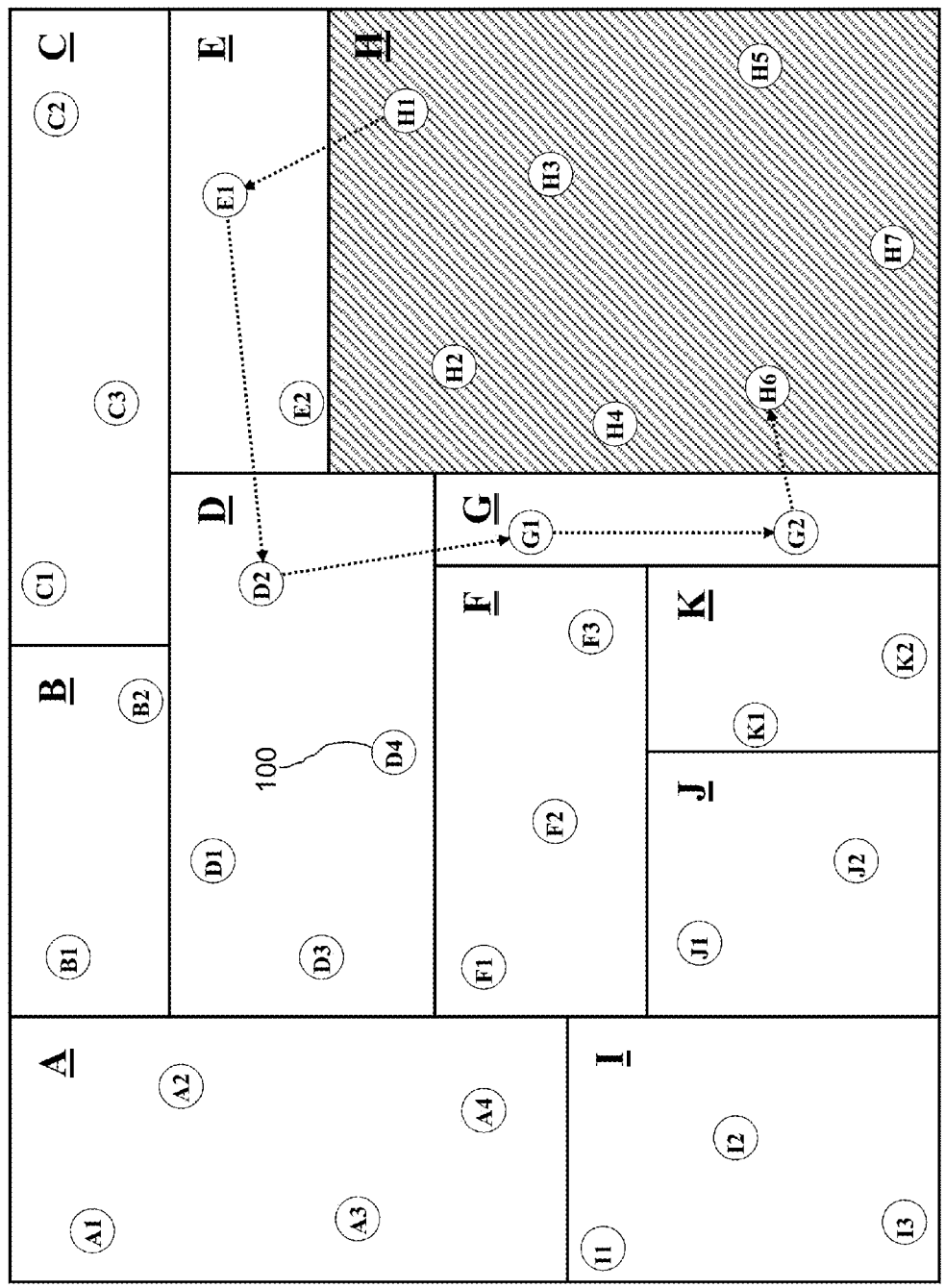
FIG. 13 is the diagram of FIG. 10, amplified to illustrate an example, in accordance with the present invention, of "unavailability" of a single compartment (the "home" compartment) due to a damage event, and the consequent selection of an inventive wireless communication route.

Particularly with reference to FIG. 13 through FIG. 15, under exigent circumstances the present invention's routing algorithm no longer defers to conventional algorithmic routing. As soon as a damage event 300 is detected in accordance with the present invention, the present invention's exigency routing principles take over. Let us assume that a damage event 300 such as a fire has commenced on the ship deck in compartment "H" and is rapidly escalating. Source node "H1" has sensed the fire (e.g., by sensing an incremental increase in temperature, or by using conventional technology for smoke detection or fire detection), and needs to direct destination node "H6" to activate a water sprinkler valve.

The present invention is typically embodied so that whichever node senses the exigent condition immediately decides to cease application of non-exigent routing principles, and to commence application of exigent routing principles. That node—the node that senses the exigent condition—is the source node seeking to convey to a destination node, located in the same compartment subnet, to take action that mitigates the exigent condition. As illustrated by FIG. 13 and FIG. 15, immediately upon cognizance by node "H1" of the exigency, the inventive routing algorithm associated with node "H1" looks outside of compartment "H" in order to route transmission from node "H1" to node "H6."

The inventive routing algorithm presumes that—due to the rapid territorial expansion of the exigent condition—it would be a waste of time trying to connect to any other nodes 100 (nodes "H2," "H3," "H4," "H5," and "H7") in the same compartment "H" subnet 500, in order to establish communication between node "H1" and "H6." Otherwise expressed, as soon as node "H1" (which is located in the compartment "H" subnet) senses danger, the inventive algorithm of node "H1" assumes that all nodes in the compartment "H" subnet, other than source node "H1" and destination node "H6," are unavailable in the wireless communication being routed. The inventive routing algorithm thus deems the "home" subnet to be in a kind of "shutdown" mode for all purposes other than wireless transmission by the source node H1 and wireless receipt by the destination node H6.

Some inventive embodiments provide for a timely sharing of exigency information among the nodes of a given compartment subnet. For instance, if node "H1" senses an exigency, node "H1" immediately informs all of the other nodes in the compartment "H" subnet, viz., nodes "H2," "H3," "H4," "H5," "H6," and "H7." Accordingly, if and when node "H1" is rendered nonfunctional due to the exigent condition, another node in the compartment "H" subnet (i.e., node "H2" or node "H3" or node "H4" or node "H5" or node "H6" or node "H7") can take to issue new commands.

Compartments "H" and "E" are adjacent compartments. As shown in FIG. 13, given the exigent circumstances, the inventive routing algorithm selects route H1-E1-D2-G1-G2-H6. In this example of inventive practice, node "E1" is the first node that the communication is directed to from node "H1," because node "E1" is the node nearest to node "H1" outside of the compartment "H" subnet. Many inventive embodiments implement this principle of "nearest outside node" in determining which node in a "non-home" subnet is the first to be hopped to from the source node in the "home" subnet. Other possible routes discoverable in accordance with inventive principles include H1-E1-H6, H1-E2-H6, H1-G1-H6, H1-G2-H6, H1-E1-G1-H6, H1-E2-G1-H6, H1-E1-G2-H6, H1-E2-G2-H6, etc.

The term "home," as used herein to describe a subnet in inventive practice associated with a wireless network, refers to the subnet in which both the source node and the destination node of a wireless communication are situated. The term "non-home" is used herein to describe, in inventive practice, a subnet that is in contradistinction to a "home" subnet. If both the source node and the destination node of a particular wireless communication are situated in a "home" subnet of a wireless network, a "non-home" subnet refers to any subnet of the wireless network in which neither the source node nor the destination node of the wireless communication is situated.

FIG. 15 is an example setting forth, in tabular fashion, the priority sequence for node "H1" (contained in compartment subnet "H") as the source node when circumstances are exigent. FIG. 15 conveys the choice of node that is contained in a non-home subnet, and to which initial communication is to be directed from source node "H1." F According to this sequential-choice scheme for node "H1," the first-choice exigency option is node "E1," located in compartment "E." If node "E1" is rendered unavailable (e.g., damaged or destroyed) by the rapidly expanding damage area, then the entire compartment "E" subnet is deemed by the inventive routing algorithm to be unavailable, and thus the second-choice exigency option comes into play, namely, node "C2," located in compartment "C." If node "C2" is rendered unavailable (e.g., damaged or destroyed) by the rapidly expanding damage area, then the entire compartment "C" subnet is deemed by the inventive routing algorithm to be unavailable, and thus the third-choice exigency option comes into play, namely, node "G1," located in compartment "G." If node "G1" is rendered unavailable (e.g., damaged or destroyed) by the rapidly expanding damage area, then the entire compartment "G" subnet is deemed by the inventive routing algorithm to be unavailable, and thus the fourth-choice exigency option comes into play, namely, node "D2," located in compartment "D."

The logic is shown in FIG. 15 to continue through the fifth-choice exigency option (node "F3," located in compartment "F"), the sixth-choice exigency option (node "B2," located in compartment "B"), the seventh-choice exigency option (node "K1," located in compartment "K"), the eight-choice exigency option (node "J2," located in compartment "J"), the ninth-choice exigency option (node "A4," located in compartment "A"), and the tenth-choice exigency option (node "I2," located in compartment "I"). Each sequential choice presupposes that the previous sequential choice is invalidated as an option due to an exigent condition. As but one example, FIG. 15 presumes that node "H1" is the source node, and gives the sequence of choices of the non-home node with which home node "H1" is to initially communicate.

The second-choice through tenth-choice exigency options represented by FIG. 15 exemplify how the present invention can be embodied to account for the possibility that a damage area may spread so rapidly and so extensively that one or more non-home subnets (e.g., adjacent or proximate non-home subnets) are adversely affected by the damage area. In other words, it is possible that damage commencing in a home subset compartment quickly breaks through at least one barrier (e.g., bulkhead) delimiting the home subset compartment, and infiltrates at least one non-home subset compartment.

FIG. 14 illustrates an example, in the context of the wireless network shown in FIG. 11 through FIG. 14, of a situation in which the damage area has spread so rapidly and so far that—not only is home subnet "H" deemed by the inventive routing algorithm to be in shutdown mode—but also six non-home subnets, viz., non-home subnets "D," "E," "F," "G," "J," and "K"—are deemed by the inventive algorithm to be in shutdown mode. FIG. 14 illustrates how an exigency can impact, not only the home compartment subnet, but also one or more (perhaps several) non-home compartments. A form of the above inventive sequential-choice logic is typically implemented by the present invention not only by the source node, but also by every non-home node along the way of the communication, until the destination node is reached. The routing that is entirely outside the home compartment subnet may blend conventional routing principles with inventive routing principles.

For instance, continuing to refer to FIG. 14, node "H1" determines that there is an exigent condition and seeks to connect outside of the home compartment subnet, viz., compartment subnet "H." As node "H1" of compartment subnet "H" proceeds through its priority sequence for finding the first non-home node to which home node H1 is to connect, node "H1" quickly rules out and bypasses first-choice non-home node E1, and then selects second-choice non-home node C2. That is, node "E1" is rendered unavailable (e.g., damaged or destroyed) by the rapidly expanding damage area, and hence the entire compartment subnet "E" is deemed by the inventive routing algorithm to be unavailable; thus, the second-choice exigency option comes into play, namely, node "C2," located in compartment "C."

Once the communication is outside the home compartment subnet, the communication may travel between two nodes within the same non-home compartment subnet, or between a node in one non-home compartment subset and a node in another non-home compartment subset. A node that is seeking to transmit the communication to another compartment subnet implements inventive sequential-choice logic such as exemplified by FIG. 15. That node selects, in accordance with inventive sequential-choice reasoning, the lowest-choice available node that exists in an outside compartment. For example, let us assume that node "D2" is the first-choice exigency option for node "C3," but is unavailable. The inventive logic goes to node "B2" as the second-choice exigency option for node "C3."

Once the communication reaches node "A4," node "A4" has the decision as to where next to send the communication. Keeping in mind that node "H6" is the destination node, node "A4" may try, according to inventive algorithmic reasoning, nodes in compartment subnets "D," "E," "G," "J," and "K," and find that all five of these subnets are unavailable. Furthermore, the inventive algorithmic reasoning will summarily dismiss any nodes in compartment subnet "I." This is because it would be counterproductive to travel in a direction away from destination node "H6" to a node in compartment subnet "I" (which is necessarily more distant from destination node "H6" than is node "A4"), where there are no available node connection options between compartment subnet "I" and destination node "H." Therefore, node "A4" directly connects to destination node "H6." Overall, the route taken from source node H–1 to destination node H6 is H1- -C2- -C3- -B2- -B1- -A2- -A4- -H6.

Figure 16:
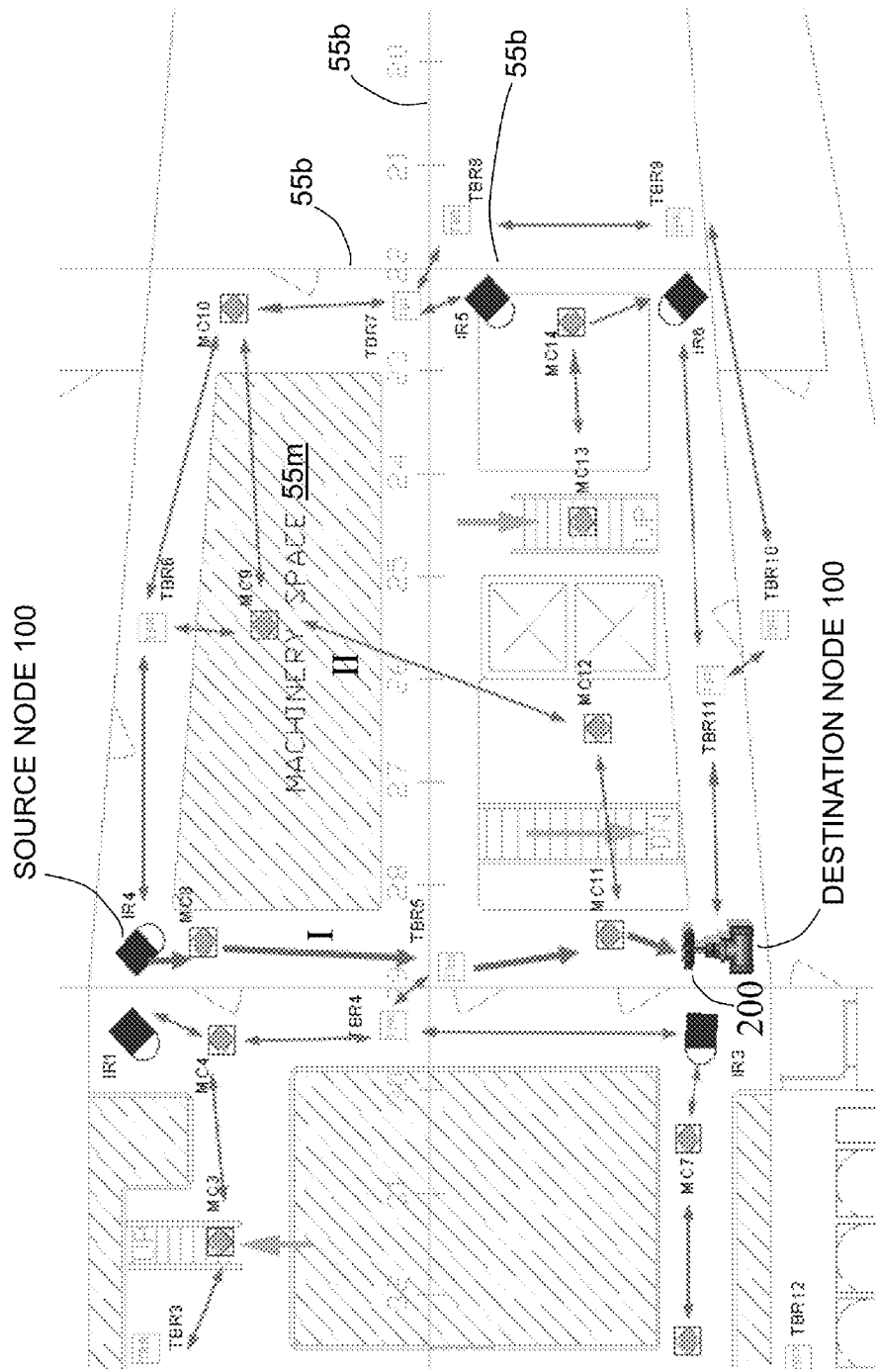
FIG. 16 is a diagram of another example of nodes in a wireless network. The nodes shown in FIG. 16 are situated in compartments that are representative of some compartments that may be demarcated by some bulkheads of a naval ship. Also shown in FIG. 16 are two wireless communication routes that may be selected, in the context shown in FIG. 16, in accordance with a conventional routing algorithm. Of the two inventive routes shown in FIG. 16, under normal circumstances (i.e., when a damage event does not occur, such as would be normal during peacetime) route "I" is less expensive than, and hence may be preferable to, route "II," because route "I" is shorter and contains fewer "hops."
Figure 17:
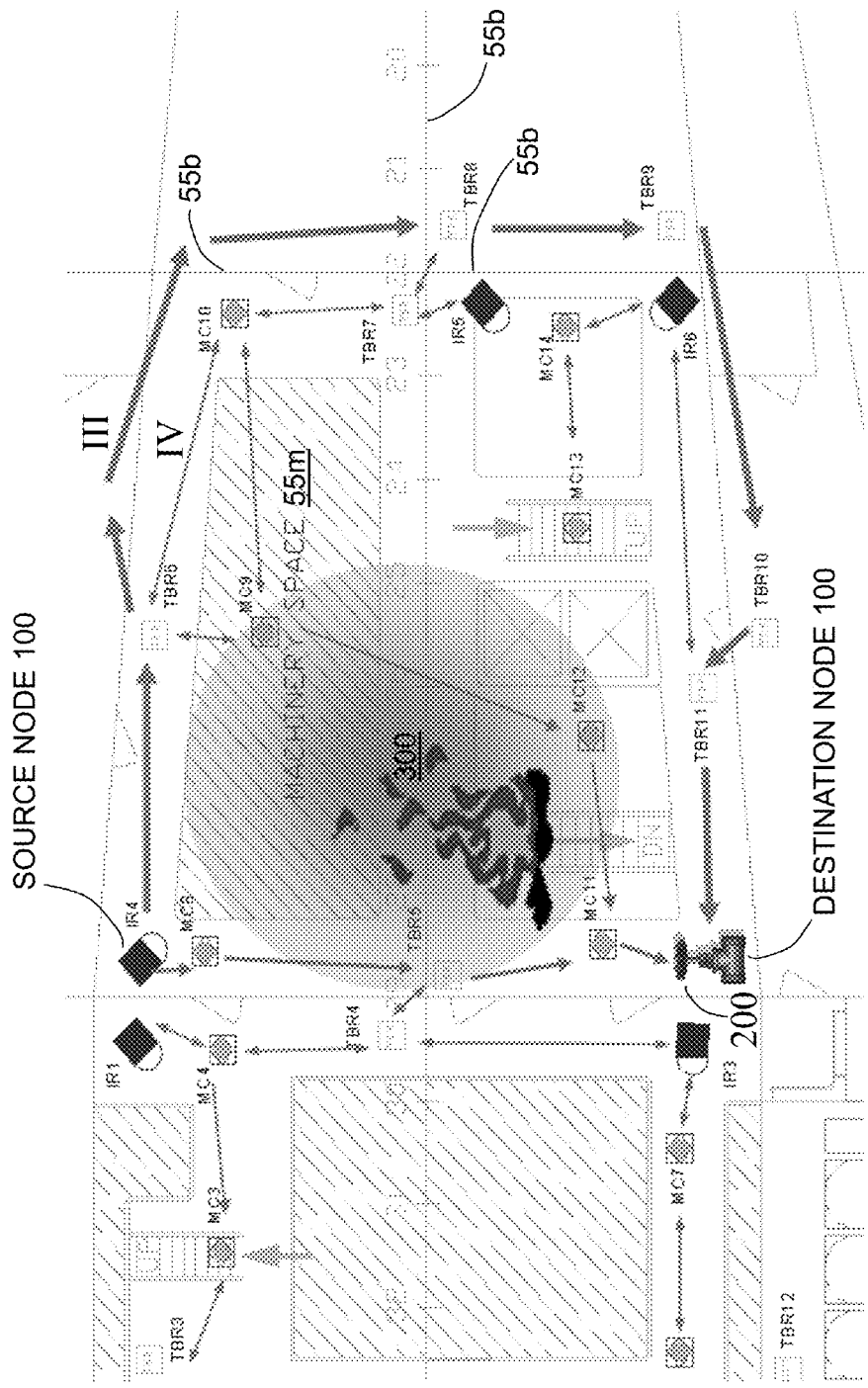
FIG. 17 is the diagram of FIG. 16, modified to show a damage event and two wireless communication routes that may be selected, in the context shown in FIG. 16, in accordance with a routing algorithm of the present invention. Of the two inventive routes shown in FIG. 17, under exigent circumstances (i.e., when a damage event occurs, such as may take place in wartime) route "III" is safer than, and hence may be preferable to, route "IV," because route "3" goes outside the compartment of damage origin faster than does route "IV." As compared to route "IV," route "III" sooner secures the insulative benefit that bulkheads afford, acting a protective barrier, with respect to a damage (e.g., explosive and/or ballistic and/or conflagrative) event.

Now referring to FIG. 16 through FIG. 18, inventive subnets may be delimited by a variety of structures, including but not limited to the machinery space 55*m* and the bulkheads 55*b*. Under the non-exigent circumstances shown in FIG. 16, an inventive algorithm embodiment may use conventional routing principles to select route "I" or route "II" between source node 100 ("IR4") and destination node 100, which is collocated with and capable of activating water sprinkler valve 200. Route "I" is shorter and less expensive than is route "II."

Under the exigent circumstances shown in FIG. 17, to effect communication between source node "IR4" and destination node "MC11," an inventive algorithm as typically embodied will use inventive routing principles to select route "III," rather than route "IV." Both route "III" and route "IV" are to some degree circumventive of the damage event 300, as each route takes advantage of the machinery space 55*m* as a barrier to the spread of the damage event 300. However, route "III" is more circumventive than is route "IV" in the sense that route "III" also takes advantage of bulkheads 55*b* as additional barriers to the spread of the damage event 300.

The present invention as typically practiced utilizes conventional principles of wireless communication under non-exigent circumstances, and utilizes novel principles of wireless communication under exigent circumstances. The present invention's novel routing principles discover routes that tend to involve higher costs, greater distances, and more hops, but that also tend to be circumventive of damage areas and to be less likely affected by damage events.

In accordance with conventional routing principles and in the absence of inventive principles, usually when a damage event occurs and the current selected conventional route is broken the new selected conventional routes are located in or near the damage area and are quickly jeopardized due to the rapid expansion of the damage area. If the conventional route searching progresses more slowly than the damage expansion, it becomes impossible to establish any new communication route under conventional routing principles. The present invention eliminates the flaws and failings of conventional routing principles under exigent circumstances, and delivers data successfully under exigent circumstances.

In effect, the inventive routing algorithm determines or predicts maximum damage areas of damage events, and selects routes that are circumventive of the maximum damage areas. For instance, in shipboard applications the present invention typically divides a wireless network into compartmental subnets, which establish maximum damage areas corresponding to sections delineated by bulkheads and other structures. Here, the temporality of "maximum" may not be in a permanent sense, but may be at least in a temporary sense of representing sufficient duration to accomplish critical communications under exigent circumstances.

Some embodiments of the present invention adapt ad hoc table-driven routing schemes to perform data transmission, in conjunction with a neural network, e.g., fuzzy logic control theory, to prepare and build up each node's environmental awareness and terrain evaluation factors in its intelligent database. In this regard, it can be noted that there is no hard distinction between route learning and performing data transmission in peacetime. According to some such inventive embodiments, the present invention's determination or prediction of maximum damage areas may be influenced by the present invention's "learning" of evaluation factors during non-exigent circumstances.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications, and changes to the principles disclosed herein may be made by one skilled in the art without departing from the true scope and spirit of the present invention, which is indicated by the following claims.

What is claimed is:

1. A wireless communication routing method of comprising:

establishing at least one exigency route, said establishing including dividing a wireless network of nodes so as to include plural subnets of nodes, said exigency route to be executed for communication that is between a source said node and a destination said node that are resident in a home said subnet that is beset with exigent circumstances, wherein each established said exigency route is characterized by an initial communicative transmission from the source said node to a said node in a non-home said subnet that is presumed to not be beset with exigent circumstances;

performing sensory monitoring of the home said subnet to determine whether the home said subnet is beset with exigent circumstances; and effecting a said initial communicative transmission, wherein the effected said initial communicative transmission is in accordance with an established said exigency route and the performed said sensory monitoring of the home said subnet;

wherein said wireless network of nodes is situated in a substantially compartmentalized setting, and wherein said subnets are divided in substantial comportment with at least some compartments of said setting.

2. A wireless communication routing method comprising:
   establishing at least one exigency route, said establishing including dividing a wireless network of nodes so as to include plural subnets of nodes, said exigency route to be executed for communication that is between a source said node and a destination said node that are resident in a home said subnet that is beset with exigent circumstances, wherein each established said exigency route is characterized by an initial communicative transmission from the source said node to a said node in a non-home said subnet that is presumed to not be beset with exigent circumstances;
   performing sensory monitoring of the home said subnet to determine whether the home said subnet is beset with exigent circumstances;
   effecting a said initial communicative transmission, wherein the effected said initial communicative transmission is in accordance with an established said exigency route and the performed said sensory monitoring of the home said subnet; and
   performing sensory monitoring of each non-home said subnet to determine whether said non-home said subnet is beset with exigent circumstances, wherein:
   the effected said initial communicative transmission is in accordance with the performed said sensory monitoring of each non-home said subnet; and
   the established said exigency route in accordance with which said initial communicative transmission is effected is determined, by the performed said sensory monitoring of each non-home said subnet, to be characterized by a said initial communicative transmission to a said node in a non-home said subset that is not beset with exigent circumstances.

3. The wireless communication routing method of claim 2, wherein said wireless network of nodes is situated in a substantially compartmentalized setting, and wherein said subnets are divided in substantial comportment with at least some compartments of said setting.

4. The wireless communication routing method of claim 2, wherein:
   said establishing is of at least two said exigency routes and includes ordering the at least two said exigency routes in terms of preference;
   said initial communicative transmission is effected in accordance with the established said exigency route of the highest said preference that is determined by said sensory monitoring to be characterized by a said initial communicative transmission to a said node in a said subset that is not beset with exigent circumstances.

5. The wireless communication routing method of claim 4, wherein each established said exigency route differs from every other established said exigency route in terms of said subset to which said initial communicative transmission is made.

6. The wireless communication routing method of claim 4, wherein said wireless network of nodes is situated in a substantially compartmentalized setting, and wherein said subnets are divided in substantial comportment with at least some compartments of said setting.

7. A computer program product comprising a non-transitory computer readable storage medium having a computer readable program stored thereon for execution by a computer to perform a method for routing communication in a multi-hop wireless ad hoc network containing a multiplicity of nodes, the method including:
   delimiting a plurality of subnets as included in a wireless network, each said subnet containing a plurality of nodes;
   monitoring each said subnet in terms of detecting an exigency in said subnet, said monitoring including sensing in said subnet at least one physical condition indicative of such exigency;
   establishing a route selection algorithm prescribing, for every said node contained in every said subnet, a preferential order of exigency-existent options for effecting a hop from said node as a transmitting said node to another said node as a receiving said node, the transmitting said node being contained in a transmitting said subnet, the receiving said node being contained in a receiving said subnet, the transmitting said subnet and the receiving said subnet being different said subnets; and
   determining a communication route between a source said node and a destination said node, said determination being based on said route selection algorithm if the source said node is contained in a said subnet in which an exigency is detected;
   wherein according to said route selection algorithm: an exigency is assumed to exist in a transmitting said subnet; any node contained in a said subnet in which an exigency is detected, other than the transmitting said subnet, is deemed to be unavailable as a receiving said node; every said node contained in every said subnet has prescribed therefor a said preferential order in which every said subnet, other than the transmitting said subnet, corresponds to an exigency-existent option as a potential receiving said subnet containing a receiving said node.

8. The computer program product of claim 7, wherein said delimiting of said subnets is performed substantially in accordance with substantially discrete spaces substantially defined by plural wall-like structures.

9. A wireless communication system comprising plural nodes generally capable of wirelessly communicating with each other, each said node including:
   a computer configured to execute computer program logic that when executed causes the computer to route wireless communication upon occurrence of a damage event, wherein according to the computer program logic:
   said nodes are divided so as to include at least four subnets of nodes;
   each of at least one said node in each said subnet has prescribed therefor a set of at least three ranked-choice alternative routes for communication when a damage event is detected in a home subnet and between a source node and a destination node that both reside in the home subnet;
   each said ranked-choice alternative route in a said set of said ranked-choice alternative routes is characterized by an initial communicative transmission from a source said node to a said node in a non-home subnet;
   no two said ranked-choice alternative routes in a said set of said ranked-choice alternative routes are characterized by a said initial communicative transmission from the source said node to a said node in the same said non-home subnet;
   said ranked-choice alternative routes in a said set of said ranked-choice alternative routes consist of a first-choice alternative route, a second-choice alternative route, and at least a third-choice alternative route;
   an nth-choice-ranked alternative route in a said set of said ranked-choice alternative routes is disqualified that is characterized by an initial communicative transmission from a source said node to a said node in a non-home subnet in which a damage event is detected;

a (n+1)th-choice alternative route is considered upon disqualification of the nth-choice alternative route;

at least one sensor, for continually sensing one or more physical parameters to detect a damage event;

a transceiver, for transmitting communicative transmissions to other said nodes, and for receiving communicative transmissions from other said nodes.

10. The wireless communication system of claim 9, wherein said nodes are divided so that said subnets are in substantial comportment with compartmentalization characterizing the physical setting of the wireless communication system.

\* \* \* \* \*